United States Patent
Preece et al.

(10) Patent No.: US 12,553,899 B2
(45) Date of Patent: Feb. 17, 2026

(54) LUMINESCENT COMPOUNDS

(71) Applicant: CHROMATWIST LIMITED, Wolverhampton (GB)

(72) Inventors: Jon Preece, Wolverhampton (GB); Alex Robinson, Wolverhampton (GB); Owen Jones, Wolverhampton (GB); Michael Butlin, Wolverhampton (GB); Zania Stamataki, Wolverhampton (GB)

(73) Assignee: CHROMATWIST LIMITED, Wolverhampton (GB)

( * ) Notice: Subject to any disclaimer, the term of this patent is extended or adjusted under 35 U.S.C. 154(b) by 996 days.

(21) Appl. No.: 17/763,168

(22) PCT Filed: Sep. 24, 2020

(86) PCT No.: PCT/GB2020/052323
§ 371 (c)(1),
(2) Date: Mar. 23, 2022

(87) PCT Pub. No.: WO2021/058968
PCT Pub. Date: Apr. 1, 2021

(65) Prior Publication Data
US 2022/0412983 A1     Dec. 29, 2022

(30) Foreign Application Priority Data
Sep. 24, 2019  (GB) ..................... 1913767

(51) Int. Cl.
C09K 11/06     (2006.01)
G01N 33/58     (2006.01)

(52) U.S. Cl.
CPC ............ *G01N 33/582* (2013.01); *C09K 11/06* (2013.01); *C09K 2211/1018* (2013.01)

(58) Field of Classification Search
CPC ............................. C09K 11/06; G01N 33/582
See application file for complete search history.

(56) References Cited

U.S. PATENT DOCUMENTS

| | | | |
|---|---|---|---|
| 3,111,525 | A | 11/1963 | Jacques et al. |
| 5,766,779 | A | 6/1998 | Shi |
| 12,041,850 | B2 | 7/2024 | Robinson et al. |
| 12,162,847 | B2 | 12/2024 | Robinson et al. |
| 2002/0070662 | A1 | 6/2002 | Moriyama et al. |
| 2003/0171412 | A1 | 9/2003 | Malamas et al. |
| 2004/0076853 | A1 | 4/2004 | Jarikov |
| 2008/0220285 | A1 | 9/2008 | Vestweber |
| 2014/0047976 | A1 | 2/2014 | Yeong et al. |
| 2016/0322569 | A1 | 11/2016 | Yen |
| 2018/0040829 | A1 | 2/2018 | Lee et al. |
| 2019/0355916 | A1 | 11/2019 | Ise |
| 2021/0070720 | A1 | 3/2021 | Robinson et al. |

(Continued)

FOREIGN PATENT DOCUMENTS

| CN | 101247808 | 8/2008 |
|---|---|---|
| CN | 101967147 | 2/2011 |
| CN | 102869672 | 1/2013 |

(Continued)

OTHER PUBLICATIONS

Nov. 16, 2024 Office Action issued in Chinese Patent Application No. 202080078756.1, pp. 1-9.
International Search Report for PCT/GB2019/050809, mailed Jul. 15, 2019, 17 pages
Search Report for GB1804511.2, dated Nov. 6, 2018, 5 pages.
Kumar et al., "Novel triphenylenoimidazole discotic liquid crystals", Tetrahedron Letters, vol. 52, No. 41, Aug. 7, 2011, pp. 5363-5367.
PubChem Compound, Dec. 24, 2015, XP002791093, 4 pages.
Exam Report issued on Jun. 15, 2022 in corresponding European Application 19714752.3, 8 pages.
Maksim V. Sednev et al., "Fluorescent dyes with large Stokes shifts for super-resolution optical microscopy of biological objects: a review," Methods and Applications in Fluorescence 3, Oct. 22, 2015, 042004, 29 pages.

(Continued)

*Primary Examiner* — Paul V Ward
(74) *Attorney, Agent, or Firm* — Nixon & Vanderhye PC

(57) ABSTRACT

A luminescent compound represented by the following general formula: wherein X represents one of a nitrogen atom, an oxygen atom, a sulphur atom, a phosphorus atom, or a selenium atom; R represents an aromatic group and/or an aliphatic group; p is an integer of 1 or 2; q and s are independently integers of 1, 2, 3, or 4; $Y^1$, $Y^2$, and $Y^3$ independently comprise, consist of, or represent a hydrogen atom, a deuterium atom, a fluorine atom, a chlorine atom, a bromine atom, a substituted or unsubstituted alkyl group, a substituted or unsubstituted aryl group, a polyether chain, a polyglycol group, an oxygen atom, a nitrogen atom, a cyano group, or a nitro group; two or more of $Y^1$, $Y^2$, and/or $Y^3$ may combine together to form a condensed ring; wherein one or more of $Y^1$, $Y^2$, and/or $Y^3$ comprises a spacing portion comprising a continuous chain of between 3 and 20 atoms, and further comprising a functional group capable of forming a covalent bond with a second species, the functional group being selected from one or more of a carboxylic acid, an ester, an azide, an amine, a maleimide, a thiol, an isothiocyanate, a carbonyl, and/or an aliphatic alcohol.

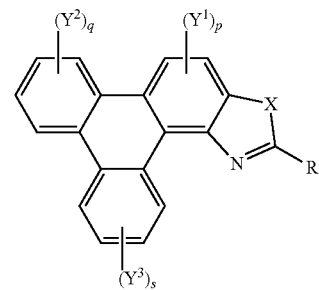

20 Claims, 6 Drawing Sheets

(56) References Cited

U.S. PATENT DOCUMENTS

2022/0357332 A1 11/2022 Preece et al.

FOREIGN PATENT DOCUMENTS

| CN | 103384671 | 11/2013 |
|---|---|---|
| CN | 105503897 | 4/2016 |
| CN | 105713003 | 6/2016 |
| CN | 104672226 | 12/2017 |
| CN | 107573328 | 1/2018 |
| CN | 108137572 | 6/2018 |
| DE | 102016010081 | 2/2018 |
| DE | 102016014502 | 6/2018 |
| EP | 0 376 288 | 7/1990 |
| EP | 0 847 228 | 6/1998 |
| GB | 955961 | 4/1964 |
| GB | 201804512.0 | 5/2018 |
| JP | 2013-071922 | 4/2013 |
| WO | 95/25710 | 9/1995 |
| WO | 2019/180444 | 9/2019 |
| WO | 2019/180445 | 9/2019 |

OTHER PUBLICATIONS

Jack W. Levell et al., "Fluorescence Enhancement by Symmetry Breaking in a Twisted Triphenylene Derivative," J. Phys. Chem. A, Oct. 1, 2010, 114, pp. 13291-13295.

Minrong Zhu et al., "Blue fluorescent emitters: design tactics and applications in organic light-emitting diodes," Chem. Soc. Rev. 2013, Jun. 21, 42(12), pp. 4963-4976.

Neville Boden et al., "Novel Discotic Liquid Crystals created by Electrophilic Aromatic Substitution," J. Mater. Chem., 1995, 5(12), pp. 2275-2281.

James A. Jordan-Hore et al., "Oxidative Pd(II)-Catalyzed C—H Bond Amination to Carbazole at Ambient Temperature" JACS Communications, Aug. 11, 2008, J. Am. Chem. Soc. 2008, 130, pp. 16184-16186.

Judith E. Berlier et al., "Quantitative Comparison of Long-wavelength Alexa Fluor Dyes to Cy Dyes: Fluorescence of the Dyes and Their Bioconjugates," The Journal of Histochemistry & Cytochemistry, vol. 51(12) 2003, pp. 1699-1712.

Richard C. Powell, "Singlet Exciton Energy Transfer in Organic Solids," Journal of Luminescence vol. 11, Sep.-Nov. 1975, pp. 1-45.

Jan Najbar et al., "External Heavy Atom Effect on Decay of the Triplet State of Aromatic Hydrocarbons. II. The Decay Functions of Phosphorescence and of ESR Signals of Triphenylene in the Presence of Iodide Ions," Journal of Luminescence, vol. 11, Issues 3-4, Dec. 1975-Feb. 1976, pp. 215-226.

May 27, 2023 Office Action issued in Chinese Patent Application No. 201980033490.6, pp. 1-13.

GB Search Report for GB1804512.0, dated Nov. 6, 2018, 7 pages.

International Search Report and Written Opinion of the ISA for PCT/GB2019/050806 mailed May 24, 2019, 16 pages.

Downer et al., "Synthesis of benzothiazoles via ipso substitution of ortho-methoxythiobenzamides", Organic & Biomolecular Chemistry, Jan. 1, 2004, vol. 2, No. 20, p. 3039.

Haydon et al., "Creating an Antibacterial with in Vivo Efficacy: Synthesis and Characterization of Potent Inhibitors of Bacterial Cell Division Protein FtsZ with Improved Pharmaceutical Properties", Journal of Medicinal Chmistry, May 27, 2019, vol. 53, No. 10, pp. 3927-3936.

Mar. 14, 2023 Office Action issued in Chinese Patent Application No. 201980033491.0 (pp. 1-22).

Wang et al., "11 Small-Molecule Fluorescent Probes for Live-Cell Super-Resolution Microscopy", Journal of the American Chemical Society, vol. 141, No. 7, Dec. 14, 2018, pp. 2770-2781.

International Search Report for PCT/GB2020/052324, mailed Dec. 11, 2020, 4 pages.

Written Opinion of the ISA for PCT/GB2020/052324, mailed Dec. 11, 2020, 7 pages.

Search Report for GB1913756.1, dated Feb. 28, 2020, 3 pages.

Ke-Qing Zhao, "Facile transformation of 1-aryltriphenylenes into dibenzo[fg,op]tetracenes by intramolecular Scholl cyclodehydrogenation: synthesis, self-assembly, and charge carrier mobility of large π-extended discogens," J. Mater. Chem. C. 2017, 5, pp. 669-682.

Sep. 27, 2023 Office Action issued in Chinese Patent Application No. 202080080218.6, pp. 1-9.

Apr. 19, 2024 Notice of Allowance issued in Chinese Patent Application No. 202080080218.6, pp. 1-4 [machine translation attached].

Aug. 26, 2024 Office Action issued in Japanese Patent Application No. 2022-543802, pp. 1-7 [machine translation included].

Heinz Langhals et al., "Uncatalyzed C—H Amination of Aromatic Compounds under Unusually Mild Conditions with Negative Enthalpies of Activation," Asian J. Org. Chem., 2017, 6, pp. 1080-1085.

Chen et al., "Triphenyleno [1, 2-c: 7, 8-c] bis (1, 2, 5) thiadiazole] as a V-Shaped Electron-Deficient Unit to Construct Wide-Bandgap Amorphous Polymers for Efficient Organic Solar Cells" ACS Applied Materials & Interfaces 13.48 (2021): 57743-57749 (Year 2021).

Tomovic, Z (2004) New discotic liquid crystals based on large polycyclic aromatic hydrocarbons as materials for molecular electronics (Doctoral dissertation, Mainz, Univ., Diss., 2005) (Year 2004).

Stopel, M. H., Blum, C., & Subramaniam, V. (2014) Excitation spectra and Stokes shift measurements of single organic dyes at room temperature. The Journal of Physical Chemistry Letters, 5(18), 3259-3264 (Year 2014).

Boden et al., "Novel Discotic Liquid Crystals created by Electrophilic Aromatic Substitution," J. Mater. Chem., 1995; vol. 5, No. 12; pp. 2275-2281.

Sep. 9, 2024 Office Action issued in Japanese Patent Application No. 2022-543801, pp. 1-4 [machine translation included].

Sandeep et al., "Novel triphenylenoimidazole discotic liquid crystals," Tetrahedron Letters, 2011, 52, pp. 5363-5367.

Gassner et al., "Remarkable Tuning of the Photophysical Properties of Bifunctional Lanthanide tris(Dipicolinates) and its Consequence on the Design of Bioprobes," Inorganic Chemistry, 2008, vol. 47, No. 17, pp. 7802-7812.

International Search Report mailed Jan. 13, 2021, in connection with corresponding international Application No. PCT/GB/2020/052323, 3 pp.

Written Opinion of the International Searching Authority mailed Jan. 13, 2021, in connection with corresponding international Application No. PCT/GB/2020/052323, 6 pp.

United Kingdom Search Report dated Mar. 6, 2020, in connection with corresponding GB Application No. 1913767.8, 3 pp.

S. Kumar et al., "Novel triphenylenoimidazole discotic liquid crystals", Tetrahedron Letters, vol. 52, No. 41, 2011, pp. 5363-5367 (5 pp.).

Anonymous: "Chapter 1: Fluorophores and Their Amine-Reactive Derivatives", in "Molecular Probes™ Handbook: A Guide to Fluorescent Probes and Labeling Technologies", Jan. 1, 2010, Thermo Fisher Scientific, XP055759755 (88 pp.).

Anonymous: "Chapter 2: Thiol-Reactive Probes", in "Molecular Probes™ Handbook: A Guide to Fluorescent Probes and Labeling Technologies", Jan. 1, 2010, Thermo Fisher Scientific, XP055759947 (26 pp.).

| | 43 |

61

62

63

Compound 44

LUMINESCENT COMPOUNDS

This application is the U.S. national phase of International Application No. PCT/GB2020/052323 filed Sep. 24, 2020 which designated the U.S. and claims priority to GB 1913767.8 filed Sep. 24, 2019, the entire contents of each of which are hereby incorporated by reference.

This invention relates generally to luminescent compounds. More specifically, although not exclusively, this invention relates to luminescent compounds capable of forming a covalent bond with a second species, e.g. a biomolecule, for use as a chemical sensor or a biosensor.

Fluorescent dyes are frequently used as labels, e.g. cell and tissue labels. Such dyes may be used in a wide range of biological applications, for example, in immunofluorescence assays, flow cytometry, fluorescence microscopy, Western blot, and cellular imaging.

Some of the most common fluorescent dyes include xanthene derivatives, e.g. fluorescein, eosin, rhodamine, Oregan green®, and Texas red®. Many other organic fluorophore families are known.

One of the most widely used classes of fluorescent dye is the Alexa Fluor® series designed by Molecular Probes and currently marketed by ThermoFisher Scientific (Waltham, Massachusetts, United States). The Alexa Fluor® series comprises more than twenty different fluorescent dyes that exhibit emission spectra that span the near-UV, visible, and near-IR spectral range.

It is known to conjugate fluorescent dyes to a biomolecule or species of interest by forming a covalent bond between the fluorescent dye and the biomolecule. For example, it is known to conjugate fluorescent dyes to antibodies. This may be used to track the conjugated antibodies to visualise its interaction with specific antigens. Typically, the fluorescent dye forms a covalent bond to the biomolecule via a functional group located on the fluorescent dye, for example, a thiol-reactive or amine-reactive functional group.

Fluorescent dyes often require an excitation wavelength in the UV or near-UV spectral range, which may cause phototoxicity. It would be advantageous to provide fluorescent dyes that do not require excitation at phototoxic wavelengths.

It is known to use fluorescent dyes in multiplex assay systems. Multiplex assays combine assays for many target analytes in a single reaction volume. This reduces workflow and sample volume problems. It is known to use combinations of different fluorescent dyes to detect different analytes. However, often the different dyes require different excitation wavelengths, which adds complexity to the system.

It would be advantageous to provide a series of luminescent compounds for use in labelling molecules, e.g. biomolecules such as antibodies, that can be excited at the same, or similar wavelengths but that emit at different wavelengths.

Accordingly, a first aspect of the invention provides a luminescent compound represented by the following general formula:

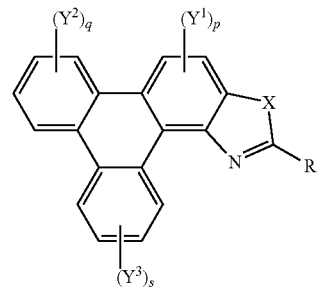

wherein X represents one of a nitrogen atom, an oxygen atom, a sulphur atom, a phosphorus atom, or a selenium atom;

R represents an aromatic group and/or an aliphatic group;

p is an integer of 1 or 2;

q and s are independently integers of 1, 2, 3, or 4;

$Y^1$, $Y^2$, and $Y^3$ independently comprise, consist of, or represent a hydrogen atom, a deuterium atom, a halogen atom (e.g. a fluorine atom, a chlorine atom, a bromine atom), a substituted or unsubstituted alkyl group, a substituted or unsubstituted aryl group, a polyether chain, a polyglycol group (e.g. a substituted or unsubstituted group comprising a polyglycol moiety), an oxygen atom (e.g. a hydroxyl group or an alkylated oxygen atom forming an alkoxy group), a nitrogen atom (e.g. a primary, secondary, or tertiary amine group), a cyano group, a nitro group;

two or more of $Y^1$, $Y^2$, and/or $Y^3$ may combine together to form a condensed ring (e.g. a condensed aromatic ring);

wherein one or more of $Y^1$, $Y^2$, and/or $Y^3$ comprises a spacing portion comprising a continuous chain of between three and twenty atoms and further comprising a functional group capable of forming a covalent bond with a second species, the functional group being selected from one or more of a carboxylic acid, an ester, an azide, an amine, a maleimide, a thiol, an isothiocyanate, a carbonyl (e.g. an aldehyde or ketone), and/or an aliphatic alcohol.

In embodiments, the second species may be a small molecule and/or a biomolecule. For example, the biomolecule may be an amino acid, a peptide, a protein, a nucleic acid, a polynucleotide, or an antibody. In embodiments, the second species is a therapeutic species or a pharmaceutically active molecule, e.g. a drug molecule.

Advantageously, the luminescent compounds of the invention are capable of being covalently bonded to a second species which may specifically bind to a molecule of interest, and hence may be used as chemical sensors or biosensors.

We define a biosensor as a sensor comprising or consisting of the luminescent compound, which is usable for the detection of, or to determine the concentration of, a chemical or biological substance.

Additionally or alternatively, the second species may be a solid support, e.g. for use in solid phase synthesis. Additionally or alternatively, the second species may be a nanoparticle, e.g. a nanoparticle comprising or formed from a metal or a metal alloy, carbon, clay, a polymer, and/or a ceramic material.

In embodiments, X represents an oxygen atom. In embodiments, X represents a sulphur atom.

The spacing portion of one or more of $Y^1$, $Y^2$, and/or $Y^3$ comprises a continuous chain of between 3 and 20 atoms, e.g. between 4 and 18 atoms, or 5 and 16 atoms, or 6 and 14 atoms, or 7 and 12 atoms, or 8 and 10 atoms, e.g. 9 atoms. The atoms may be selected from carbon atoms or a combination of carbon atoms and heteroatoms, e.g. oxygen atoms and/or nitrogen atoms.

When referring to the continuous chain of the spacing portion, by continuous chain of between 3 and 20 atoms, we mean carbon atoms, or a combination of carbon atoms and heteroatoms, covalently bonded in an unbroken linear chain of between 3 to 20 atoms to form a backbone. The carbon atoms and/or heteroatoms (which form the backbone of the spacing portion) may have other atoms, e.g. hydrogen atoms, branching alkyl or aryl groups, attached or bonded thereto, which are not included as part of the definition of the continuous chain of between 3 to 20 atoms.

It is to be understood that the spacing portion and the functional group are distinct moieties and their definitions do not overlap. That is, the functional group is distinct from the continuous chain of 3 to 20 atoms of the spacing portion.

In embodiments, the continuous chain of the spacing portion may comprise a continuous chain of one of 3, 4, 5, 6, 7, 8, 9, 10, 11, 12, 13, 14, 15, 16, 17, 18, 19, or 20 atoms.

The spacing portion of one or more of $Y^1$, $Y^2$, and/or $Y^3$ may comprise or consist of a polyether chain, which is covalently bonded to the functional group capable of forming a covalent bond with a second species. For example, the spacing portion of one or more of $Y^1$, $Y^2$, and/or $Y^3$ may comprise or consist of a polyether chain comprising a continuous chain of between five and twenty atoms, e.g. 5, 6, 7, 8, 9, 10, 11, 12, 13, 14, 15, 16, 17, 18, 19, or 20 atoms selected from carbon atoms and oxygen atoms. In embodiments, continuous chain of the spacing portion of one or more of $Y^1$, $Y^2$, and/or $Y^3$ may comprise or consist of a polyether chain having a continuous chain of nine atoms selected from carbon and oxygen.

In embodiments, the functional group (FG) capable of forming a covalent bond with a second species may be located at the terminus of the spacing portion.

In embodiments, the spacing portion may consist of an —O—(CH$_2$CH$_2$O)$_2$CH$_2$CH$_2$— moiety. In embodiments, the spacing portion may consist of an —O—(CH$_2$CH$_2$O)$_2$CH$_2$— moiety. The functional group (FG) capable of forming a covalent bond with a second species may be located at the terminus of the spacing portion, such that one or more of $Y^1$, $Y^2$, and/or $Y^3$ consists of —O—(CH$_2$CH$_2$O)$_2$CH$_2$CH$_2$FG or —O—(CH$_2$CH$_2$O)$_2$CH$_2$FG.

In embodiments, the luminescent compound is a triphenylene derivative, that is, the luminescent compound comprises a triphenylene core. In embodiments, luminescent compound comprises a core comprising a polycyclic aromatic hydrocarbon, e.g. comprising five, six, seven, eight, nine, ten, eleven, twelve, thirteen, fourteen, fifteen, sixteen, seventeen, eighteen, nineteen, or twenty or more fused 6-membered rings. For example, the luminescent compound may comprise a core comprising a polycyclic aromatic hydrocarbon comprising six fused 6-membered rings.

In embodiments, the luminescent compound is represented by the following general formula:

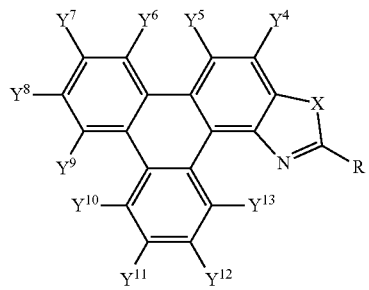

wherein X represents one of a nitrogen atom, an oxygen atom, a sulphur atom, a phosphorus atom, or a selenium atom;

R represents an aromatic group and/or an aliphatic group; $Y^4$, $Y^5$, $Y^6$, $Y^7$, $Y^8$, $Y^9$, $Y^{10}$, $Y^{11}$, $Y^{12}$, $Y^{13}$ independently comprise, consist of, or represent a hydrogen atom, a deuterium atom, a fluorine atom, a chlorine atom, a bromine atom, a substituted or unsubstituted alkyl group, a substituted or unsubstituted aryl group, a polyether chain, a polyglycol group (e.g. a substituted or unsubstituted group comprising a polyglycol moiety), an oxygen atom (e.g. a hydroxyl group or an alkylated oxygen atom forming an alkoxy group), a nitrogen atom (e.g. a primary, secondary, or tertiary amine group), a cyano group, a nitro group;

two or more of $Y^4$, $Y^5$, $Y^6$, $Y^7$, $Y^8$, $Y^9$, $Y^{10}$, $Y^{11}$, $Y^{12}$, $Y^{13}$ may combine together to form a condensed ring (e.g. a condensed aromatic ring);

wherein one or more of $Y^4$, $Y^5$, $Y^6$, $Y^7$, $Y^8$, $Y^9$, $Y^{10}$, $Y^{11}$, $Y^{12}$, $Y^{13}$ comprises a spacing portion comprising a continuous chain of between three and twenty atoms and further comprising a functional group capable of forming a covalent bond with a second species, the functional group being selected from one or more of a carboxylic acid, an ester, an azide, an amine, a maleimide, a thiol, an isothiocyanate, a carbonyl (e.g. an aldehyde or ketone), and/or an aliphatic alcohol.

The spacing portion of one or more of $Y^4$, $Y^5$, $Y^6$, $Y^7$, $Y^8$, $Y^9$, $Y^{10}$, $Y^{11}$, $Y^{12}$, $Y^{13}$ comprises a continuous chain of between 3 and 20 atoms, e.g. between 4 and 18 atoms, or 5 and 16 atoms, or 6 and 14 atoms, or 7 and 12 atoms, or 8 and 10 atoms, e.g. 9 atoms. The atoms may be carbon atoms or a combination of carbon atoms and heteroatoms, e.g. oxygen atoms and/or nitrogen atoms.

In embodiments, the continuous chain of the spacing portion may comprise a continuous chain of one of 3, 4, 5, 6, 7, 8, 9, 10, 11, 12, 13, 14, 15, 16, 17, 18, 19, or 20 atoms.

The spacing portion of one or more of $Y^4$, $Y^5$, $Y^6$, $Y^7$, $Y^8$, $Y^9$, $Y^{10}$, $Y^{11}$, $Y^{12}$, $Y^{13}$ may comprise or consist of a polyether chain, which is covalently bonded to the functional group capable of forming a covalent bond with a second species. For example, the spacing portion of one or more of $Y^4$, $Y^5$, $Y^6$, $Y^7$, $Y^8$, $Y^9$, $Y^{10}$, $Y^{11}$, $Y^{12}$, $Y^{13}$ may comprise or consist of a polyether chain comprising a continuous chain of between five and twenty atoms, e.g. 5, 6, 7, 8, 9, 10, 11, 12, 13, 14, 15, 16, 17, 18, 19, or 20 atoms selected from carbon atoms and oxygen atoms. In embodiments, continuous chain of the spacing portion of one or more of $Y^4$, $Y^5$, $Y^6$, $Y^7$, $Y^8$, $Y^9$, $Y^{10}$, $Y^{11}$, $Y^{12}$, $Y^{13}$ may comprise or consist of a polyether chain having a continuous chain of nine atoms selected from carbon and oxygen.

In embodiments, the functional group (FG) capable of forming a covalent bond with a second species may be located at a or the terminus of the spacing portion.

In embodiments, the spacing portion may consist of an —O—(CH$_2$CH$_2$O)$_2$CH$_2$CH$_2$— moiety. In embodiments, the spacing portion may consist of an —O—(CH$_2$CH$_2$O)$_2$CH$_2$— moiety. The functional group (FG) capable of forming a covalent bond with a second species may be located at the terminus of the spacing portion, such that one or more of Y$^4$, Y$^5$, Y$^6$, Y$^7$, Y$^8$, Y$^9$, Y$^{10}$, Y$^{11}$, Y$^{12}$, Y$^{13}$ consists of —O—(CH$_2$CH$_2$O)$_2$CH$_2$CH$_2$FG or —O—(CH$_2$CH$_2$O)$_2$CH$_2$FG.

In the luminescent compounds of the invention, one or more of Y$^4$, Y$^5$, Y$^6$, Y$^7$, Y$^8$, Y$^9$, Y$^{10}$, Y$^{11}$, Y$^{12}$, Y$^{13}$ comprises a spacing portion and a functional group as defined above. The remainder of Y$^4$, Y$^5$, Y$^6$, Y$^7$, Y$^8$, Y$^9$, Y$^{10}$, Y$^{11}$, Y$^{12}$, Y$^{13}$ may not comprise such a spacing portion and/or a functional group. In embodiments, a single one of Y$^4$, Y$^5$, Y$^6$, Y$^7$, Y$^8$, Y$^9$, Y$^{10}$, Y$^{11}$, Y$^{12}$, Y$^{13}$ may comprise the spacing portion and functional group, and the remainder will not. In an embodiment, Y$^{12}$ comprises the spacing portion and the functional group, and Y$^4$, Y$^5$, Y$^6$, Y$^7$, Y$^8$, Y$^9$, Y$^{10}$, Y$^{11}$, Y$^{13}$ does not comprise the spacing portion and the functional group.

Wherein one or more, or all except for one, of Y$^1$ to Y$^3$, or Y$^4$ to Y$^{13}$ do not comprise the spacing portion and the functional group, Y$^1$ to Y$^{13}$ may represent or comprise an alkyl group. The alkyl group(s) may be a straight or linear chain, or may comprise a branched chain, and/or may be further functionalised. Additionally or alternatively, Y$^1$ to Y$^3$, or Y$^4$ to Y$^{13}$ may independently represent or comprise an aryl group. The aryl group(s) may be unsubstituted or may be further functionalised. In embodiments, Y$^4$ to Y$^{13}$ independently may represent or comprise a polyether chain or polyglycol group, e.g. a polyethylene glycol moiety. The polyether chain or polyglycol chain may comprise a total of between 1 and 20 carbon and oxygen atoms, e.g. between 2 and 18 carbon and oxygen atoms, 3 and 17 carbon and oxygen atoms, 4 and 16 carbon and oxygen atoms, 5 and 15 carbon and oxygen atoms, 6 and 14 carbon and oxygen atoms, 7 and 13 carbon and oxygen atoms, 8 and 12 carbon and oxygen atoms, or between 9 and 11 carbon and oxygen atoms In embodiments, one or more of Y$^1$ to Y$^3$, or Y$^4$ to Y$^{13}$, may independently represent or comprise an alkoxy group, e.g. an OR' group wherein R' is a straight or branched alkyl chain. The alkyl chain may comprise between 1 and 20 carbon atoms, e.g. between 2 and 18 carbon atoms, 3 and 17 carbon atoms, 4 and 16 carbon atoms, 5 and 15 carbon atoms, 6 and 14 carbon atoms, 7 and 13 carbon atoms, 8 and 12 carbon atoms, or between 9 and 11 carbon atoms.

In embodiments, one or more, e.g. all apart from one, of Y$^1$ to Y$^3$, or all apart from one of Y$^4$ to Y$^{13}$ may comprise or consist of a straight chain alkoxy group, e.g. selected from one or more of a OCH$_3$, OC$_2$H$_5$, OC$_3$H$_7$, OC$_4$H$_9$, OC$_5$H$_{11}$, OC$_6$H$_{13}$, OC$_7$H$_{15}$, OC$_8$H$_{17}$, OC$_9$H$_{19}$, or OCH$_{10}$H$_{21}$ group or combinations thereof.

In embodiments, Y$^5$, Y$^6$, Y$^9$, Y$^{10}$, Y$^{13}$ each represent a hydrogen atom.

In embodiments, Y$^4$, Y$^7$, Y$^8$, Y$^{11}$ each represent an OR' group. The OR' group may be selected from OCH$_3$, OC$_2$H$_5$, OC$_3$H$_7$, OC$_4$H$_9$, OC$_5$H$_{11}$, OC$_6$H$_{13}$, OC$_7$H$_{15}$, OC$_8$H$_{17}$, OC$_9$H$_{19}$, or OC$_{10}$H$_{21}$. For example, Y$^4$, Y$^7$, Y$^8$, Y$^{11}$ may each represent an OC$_5$H$_{11}$ group.

In embodiments, Y$^{12}$ represents the spacing portion and the functional group capable of forming a covalent bond with the second species. For example, Y$^{12}$ may represent a —O—(CH$_2$CH$_2$O)$_2$CH$_2$CH$_2$FG moiety or a —O—(CH$_2$CH$_2$O)$_2$CH$_2$FG moiety wherein FG is the functional group capable of forming a covalent bond with a second species.

For example, in embodiments, X represents an oxygen atom, and/or Y$^6$, Y$^6$, Y$^9$, Y$^{10}$, Y$^{13}$ each represent a hydrogen atom, Y$^4$, Y$^7$, Y$^8$, Y$^{11}$ each represent an OR' group (e.g. a OC$_5$H$_{11}$ group), and Y$^{12}$ represents a —O—(CH$_2$CH$_2$O)$_2$CH$_2$CH$_2$FG moiety.

In embodiments, Y$^8$ represents an oxygen atom and Y$^9$ represents a nitrogen atom, Y$^8$ and Y$^9$ being bonded to form an oxazole moiety comprising an R group selected from an aromatic group and/or an aliphatic group.

In embodiments, the luminescent compound is represented by the following general formula:

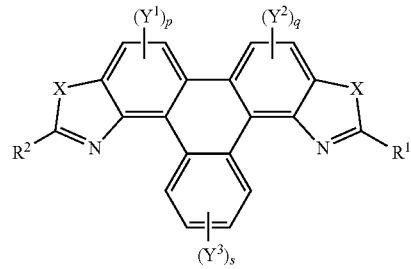

wherein X represents one of a nitrogen atom, an oxygen atom, a sulphur atom, a phosphorus atom, or a selenium atom;

R$^1$ and R$^2$ independently represents an aromatic group and/or an aliphatic group;

p and q are independently an integer of 1 to 2;

s is an integer of 1 to 4;

Y$^1$, Y$^2$, and Y$^3$ independently comprise, consist of, or represent a hydrogen atom, a deuterium atom, a fluorine atom, a chlorine atom, a bromine atom, a substituted or unsubstituted alkyl group, a substituted or unsubstituted aryl group, a polyether chain, a polyglycol group (e.g. a substituted or unsubstituted group comprising a polyglycol moiety), an oxygen atom (e.g. a hydroxyl group or an alkylated oxygen atom forming an alkoxy group), a nitrogen atom (e.g. a primary, secondary, or tertiary amine group), a cyano group, a nitro group;

two or more of Y$^1$, Y$^2$, or Y$^3$ may combine together to form a condensed ring (e.g. a condensed aromatic ring);

wherein one or more of Y$^1$, Y$^2$, Y$^3$ comprise a spacing portion comprising a continuous chain of between 3 and 20 atoms and further comprising a functional group capable of forming a covalent bond with a second species, the functional group being selected from one or more of a carboxylic acid, an ester, an azide, an amine, a maleimide, a thiol, an isothiocyanate a carbonyl (e.g. an aldehyde or ketone), and/or an aliphatic alcohol.

In embodiments comprising more than one X atom, preferably the X atom is the same type of heteroatom, i.e. one of a nitrogen atom, an oxygen atom, a sulphur atom, a phosphorus atom, or a selenium atom.

In embodiments, Y$^6$ represents an oxygen atom and Y$^7$ represents a nitrogen atom, Y$^6$ and Y$^7$ being bonded to form an oxazole moiety comprising an R group selected from an aromatic group and/or an aliphatic group. Additionally or alternatively, $Y^{11}$ represents an oxygen atom and $Y^{10}$ represents a nitrogen atom, $Y^{11}$ and $Y^{10}$ being bonded to form an oxazole moiety comprising an R group selected from an aromatic group and/or an aliphatic group. In embodiments, the luminescent compound comprises one, two, or three oxazole moieties.

In embodiments, the luminescent compound is represented by the following general formula:

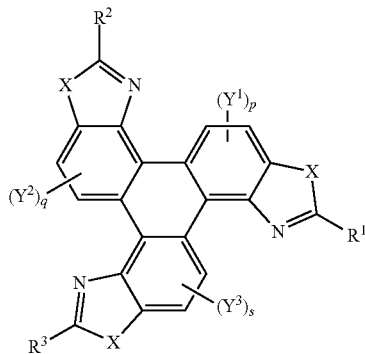

wherein X represents one of a nitrogen atom, an oxygen atom, a sulphur atom, a phosphorus atom, or a selenium atom;

$R^1$, $R^2$, $R^3$ independently represent an aromatic group and/or an aliphatic group;

p, q, and s are each independently an integer of 1 to 2;

$Y^1$, $Y^2$, and $Y^3$ independently comprise, consist of, or represent a hydrogen atom, a deuterium atom, a fluorine atom, a chlorine atom, a bromine atom, a substituted or unsubstituted alkyl group, a substituted or unsubstituted aryl group, a polyether chain, a polyglycol group (e.g. a substituted or unsubstituted group comprising a polyglycol moiety), an oxygen atom (e.g. a hydroxyl group or an alkylated oxygen atom forming an alkoxy group), a nitrogen atom (e.g. a primary, secondary, or tertiary amine group), a cyano group, a nitro group;

wherein one or more of $Y^1$, $Y^2$, $Y^3$ comprise a spacing portion comprising a continuous chain of between 3 and 20 atoms and further comprising a functional group capable of forming a covalent bond with a second species, the functional group being selected from one or more of a carboxylic acid, an ester, an azide, an amine, a maleimide, a thiol, an isothiocyanate a carbonyl (e.g. an aldehyde or ketone), and/or an aliphatic alcohol.

Preferably, $R^1$, $R^2$, $R^3$ represent the same type of group, e.g. $R^1$, $R^2$, $R^3$ may each represent a naphthalene group.

In embodiments, $Y^5$ and $Y^6$ represent carbon atoms that combine together to form a condensed ring, e.g. a condensed aromatic ring fused to the core of the luminescent compound.

In embodiments, the luminescent compound may be represented by the following general formula:

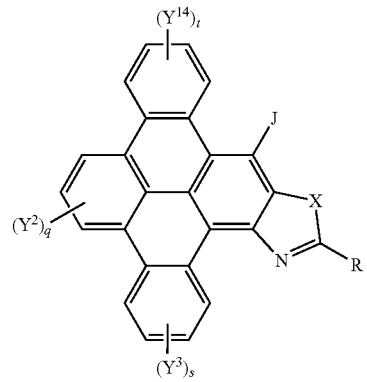

wherein X represents one of a nitrogen atom, an oxygen atom, a sulphur atom, a phosphorus atom, or a selenium atom;

R independently represents an aromatic group and/or an aliphatic group;

q is independently an integer of 1 to 3;

s is independently an integer of 1 to 4;

t is independently an integer of 1 to 4;

$Y^2$, $Y^3$, and $Y^{14}$ and J independently comprise, consist of, or represent a hydrogen atom, a deuterium atom, a fluorine atom, a chlorine atom, a bromine atom, a substituted or unsubstituted alkyl group, a substituted or unsubstituted aryl group, a polyether chain, a polyglycol group (e.g. a substituted or unsubstituted group comprising a polyglycol moiety), an oxygen atom (e.g. a hydroxyl group or an alkylated oxygen atom forming an alkoxy group), a nitrogen atom (e.g. a primary, secondary, or tertiary amine group), a cyano group, a nitro group;

two or more of $Y^2$, $Y^3$, and/or $Y^{14}$ may combine together to form a condensed ring (e.g. a condensed aromatic ring);

wherein one or more of $Y^2$, $Y^3$, $Y^{14}$ and/or J comprise a spacing portion comprising a continuous chain of between 3 and 20 atoms and further comprising a functional group capable of forming a covalent bond with a second species, the functional group being selected from one or more of a carboxylic acid, an ester, an azide, an amine, a maleimide, a thiol, an isothiocyanate a carbonyl (e.g. an aldehyde or ketone), and/or an aliphatic alcohol.

The spacing portion of one or more of $Y^2$, $Y^3$, $Y^{14}$ and/or J comprises a continuous chain of between 3 and 20 atoms, e.g. between 4 and 18 atoms, or 5 and 16 atoms, or 6 and 14 atoms, or 7 and 12 atoms, or 8 and 10 atoms, e.g. 9 atoms. The atoms may be carbon atoms or a combination of carbon atoms and heteroatoms, e.g. oxygen atoms and/or nitrogen atoms.

In embodiments, the continuous chain of the spacing portion may comprise a continuous chain of one of 3, 4, 5, 6, 7, 8, 9, 10, 11, 12, 13, 14, 15, 16, 17, 18, 19, or 20 atoms.

The spacing portion of one or more of $Y^2$, $Y^3$, $Y^{14}$ and/or J may comprise or consist of a polyether chain, which is covalently bonded to the functional group capable of forming a covalent bond with a second species. For example, the spacing portion of one or more of $Y^2$, $Y^3$, $Y^{14}$ and/or J may comprise or consist of a polyether chain comprising a continuous chain of between five and twenty atoms, e.g. 5, 6, 7, 8, 9, 10, 11, 12, 13, 14, 15, 16, 17, 18, 19, or 20 atoms selected from carbon atoms and oxygen atoms. In embodiments, continuous chain of the spacing portion of one or more of $Y^2$, $Y^3$, $Y^{14}$ and/or J may comprise or consist of a polyether chain having a continuous chain of nine atoms selected from carbon and oxygen.

In embodiments, the functional group (FG) capable of forming a covalent bond with a second species may be located at a or the terminus of the spacing portion.

In embodiments, the spacing portion may consist of an —O—(CH$_2$CH$_2$O)$_2$CH$_2$CH$_2$— moiety. In embodiments, the spacing portion may consist of an —O—(CH$_2$CH$_2$O)$_2$CH$_2$— moiety. The functional group (FG) capable of forming a covalent bond with a second species may be located at the terminus of the spacing portion, such that one or more of $Y^2$, $Y^3$, $Y^{14}$ and/or J consists of —O—(CH$_2$CH$_2$O)$_2$CH$_2$CH$_2$FG or —O—(CH$_2$CH$_2$O)$_2$CH$_2$FG.

In embodiments, the luminescent compound(s) may be represented by the following general formula:

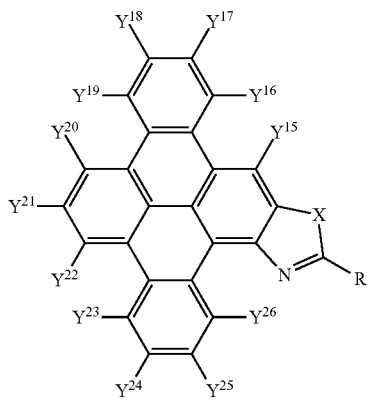

wherein X represents one of a nitrogen atom, an oxygen atom, a sulphur atom, a phosphorus atom, or a selenium atom;

R independently represents an aromatic group and/or an aliphatic group;

$Y^{15}$, $Y^{16}$, $Y^{17}$, $Y^{18}$, $Y^{19}$, $Y^{20}$, $Y^{21}$, $Y^{22}$, $Y^{23}$, $Y^{24}$, $Y^{25}$, $Y^{26}$ independently comprise, consist of, or represent a hydrogen atom, a deuterium atom, a fluorine atom, a chlorine atom, a bromine atom, a substituted or unsubstituted alkyl group, a substituted or unsubstituted aryl group, a polyether chain, a polyglycol group (e.g. a substituted or unsubstituted group comprising a polyglycol moiety), an oxygen atom (e.g. a hydroxyl group or an alkylated oxygen atom forming an alkoxy group), a nitrogen atom (e.g. a primary, secondary, or tertiary amine group), a cyano group, a nitro group;

two or more of $Y^{15}$, $Y^{16}$, $Y^{17}$, $Y^{18}$, $Y^{19}$, $Y^{20}$, $Y^{21}$, $Y^{22}$, $Y^{23}$, $Y^{24}$, $Y^{25}$, $Y^{26}$ combine together to form a condensed ring (e.g. a condensed aromatic ring);

wherein one or more of or more of $Y^{15}$, $Y^{16}$, $Y^{17}$, $Y^{18}$, $Y^{19}$, $Y^{20}$, $Y^{21}$, $Y^{22}$, $Y^{23}$, $Y^{24}$, $Y^{25}$, $Y^{26}$ comprise a spacing portion comprising a continuous chain of between 3 and 20 atoms and further comprising a functional group capable of forming a covalent bond with a second species, the functional group being selected from one or more of a carboxylic acid, an ester, an azide, an amine, a maleimide, a thiol, an isothiocyanate a carbonyl (e.g. an aldehyde or ketone), and/or an aliphatic alcohol.

The spacing portion of one or more of $Y^{15}$, $Y^{16}$, $Y^{17}$, $Y^{18}$, $Y^{19}$, $Y^{20}$, $Y^{21}$, $Y^{22}$, $Y^{23}$, $Y^{24}$, $Y^{25}$, $Y^{26}$ comprises a continuous chain of between 3 and 20 atoms, e.g. between 4 and 18 atoms, or 5 and 16 atoms, or 6 and 14 atoms, or 7 and 12 atoms, or 8 and 10 atoms, e.g. 9 atoms. The atoms may be carbon atoms or a combination of carbon atoms and heteroatoms, e.g. oxygen atoms and/or nitrogen atoms.

In embodiments, the continuous chain of the spacing portion may comprise a continuous chain of one of 3, 4, 5, 6, 7, 8, 9, 10, 11, 12, 13, 14, 15, 16, 17, 18, 19, or 20 atoms.

The spacing portion of one or more of $Y^{15}$, $Y^{16}$, $Y^{17}$, $Y^{18}$, $Y^{19}$, $Y^{20}$, $Y^{21}$, $Y^{22}$, $Y^{23}$, $Y^{24}$, $Y^{25}$, $Y^{26}$ may comprise or consist of a polyether chain, which is covalently bonded to the functional group capable of forming a covalent bond with a second species. For example, the spacing portion of one or more of $Y^{15}$, $Y^{16}$, $Y^{17}$, $Y^{18}$, $Y^{19}$, $Y^{20}$, $Y^{21}$, $Y^{22}$, $Y^{23}$, $Y^{24}$, $Y^{25}$, $Y^{26}$ may comprise or consist of a polyether chain comprising a continuous chain of between five and twenty atoms, e.g. 5, 6, 7, 8, 9, 10, 11, 12, 13, 14, 15, 16, 17, 18, 19, or 20 atoms selected from carbon atoms and oxygen atoms. In embodiments, continuous chain of the spacing portion of one or more of $Y^{15}$, $Y^{16}$, $Y^{17}$, $Y^{18}$, $Y^{19}$, $Y^{20}$, $Y^{21}$, $Y^{22}$, $Y^{23}$, $Y^{24}$, $Y^{25}$, $Y^{26}$ may comprise or consist of a polyether chain having a continuous chain of nine atoms selected from carbon and oxygen.

In embodiments, the functional group (FG) capable of forming a covalent bond with a second species may be located at the terminus of the spacing portion.

In embodiments, the spacing portion may consist of an —O—(CH$_2$CH$_2$O)$_2$CH$_2$CH$_2$— moiety. In embodiments, the spacing portion may consist of an —O—(CH$_2$CH$_2$O)$_2$CH$_2$— moiety. The functional group (FG) capable of forming a covalent bond with a second species may be located at the terminus of the spacing portion, such that one or more of $Y^{15}$, $Y^{16}$, $Y^{17}$, $Y^{18}$, $Y^{19}$, $Y^{20}$, $Y^{21}$, $Y^{22}$, $Y^{23}$, $Y^{24}$, $Y^{25}$, $Y^{26}$ consists of —O—(CH$_2$CH$_2$O)$_2$CH$_2$CH$_2$FG or —O—(CH$_2$CH$_2$O)$_2$CH$_2$FG.

In embodiments, $Y^{21}$ represents an oxygen atom and $Y^{22}$ represents a nitrogen atom, $Y^{21}$ and $Y^{22}$ being bonded to form an oxazole moiety comprising an R group selected from an aromatic group and/or an aliphatic group.

Wherein one or more or all except for one of $Y^{15}$, $Y^{16}$, $Y^{17}$, $Y^{18}$, $Y^{19}$, $Y^{20}$, $Y^{21}$, $Y^{22}$, $Y^{23}$, $Y^{24}$, $Y^{25}$, $Y^{26}$, do not comprise a spacing portion and a functional group, $Y^{15}$, $Y^{16}$, $Y^{17}$, $Y^{18}$, $Y^{19}$, $Y^{20}$, $Y^{21}$, $Y^{22}$, $Y^{23}$, $Y^{24}$, $Y^{25}$, $Y^{26}$, may independently represent or comprise an alkyl group. The alkyl group(s) may be a straight or linear chain, or may comprise a branched chain, and/or may be further functionalised. Additionally or alternatively, $Y^{15}$, $Y^{16}$, $Y^{17}$, $Y^{18}$, $Y^{19}$, $Y^{20}$, $Y^{21}$, $Y^{22}$, $Y^{23}$, $Y^{24}$, $Y^{25}$, $Y^{26}$, may independently represent or comprise an aryl group. The aryl group(s) may be unsubstituted or may be further functionalised. In embodiments, $Y^{15}$, $Y^{16}$, $Y^{17}$, $Y^{18}$, $Y^{19}$, $Y^{20}$, $Y^{21}$, $Y^{22}$, $Y^{23}$, $Y^{24}$, $Y^{25}$, $Y^{26}$ may independently represent or comprise a polyether chain or polyglycol group, e.g. a polyethylene glycol moiety. The polyether chain or polyglycol chain may comprise a total of between 1 and 20 carbon and oxygen atoms, e.g. between 2 and 18 carbon and oxygen atoms, 3 and 17 carbon and oxygen atoms, 4 and 16 carbon and oxygen atoms, 5 and 15 carbon and oxygen atoms, 6 and 14 carbon and oxygen atoms, 7 and 13 carbon and oxygen atoms, 8 and 12 carbon and oxygen atoms, or between 9 and 11 carbon and oxygen atoms In embodiments, one or more of $Y^{15}$, $Y^{16}$, $Y^{17}$, $Y^{18}$, $Y^{19}$, $Y^{20}$, $Y^{21}$, $Y^{22}$, $Y^{23}$, $Y^{24}$, $Y^{25}$, $Y^{26}$, may independently represent or comprise an alkoxy group, e.g. an OR' group wherein R' is a straight or branched alkyl chain. The alkyl chain may comprise between 1 and 20 carbon atoms, e.g. between 2 and 18 carbon atoms, 3 and 17 carbon atoms, 4 and 16 carbon atoms, 5 and 15 carbon atoms, 6 and 14 carbon atoms, 7 and 13 carbon atoms, 8 and 12 carbon atoms, or between 9 and 11 carbon atoms.

In embodiments, one or more, e.g. all apart from one of $Y^{15}$, $Y^{16}$, $Y^{17}$, $Y^{18}$, $Y^{19}$, $Y^{20}$, $Y^{21}$, $Y^{22}$, $Y^{23}$, $Y^{24}$, $Y^{25}$, $Y^{26}$ may comprise a straight chain alkoxy group, e.g. selected from one or more of a $OCH_3$, $OC_2H_5$, $OC_3H_7$, $OC_4H_9$, $OC_5H_{11}$, $OC_6H_{13}$, $OC_7H_{15}$, $OC_8H_{17}$, $OC_9H_{19}$, or $OC_{10}H_{21}$ group.

In embodiments, $Y^{16}$, $Y^{19}$, $Y^{22}$, $Y^{23}$, $Y^{26}$ each represent a hydrogen atom.

In embodiments, $Y^{15}$, $Y^{17}$, $Y^{18}$, $Y^{20}$, $Y^{21}$, $Y^{24}$, $Y^{25}$ each represent an OR' group. For example, $Y^{15}$, $Y^{20}$, $Y^{21}$, $Y^{24}$, $Y^{25}$ may each represent an $OC_5H_{11}$ group. For example, $Y^{17}$, $Y^{18}$ may each represent an $OCH_3$ group.

In embodiments, one or more of $Y^{15}$, $Y^{17}$, $Y^{18}$, $Y^{20}$, $Y^{21}$, $Y^{24}$, $Y^{25}$ (for example $Y^{17}$ only) represents the spacing portion and the functional group. For example, $Y^{17}$ may represent a —O—$(CH_2CH_2O)_2CH_2CH_2$FG moiety wherein FG is the functional group capable of forming a covalent bond with a second species.

For example, in embodiments, X represents an oxygen atom, $Y^{16}$, $Y^{19}$, $Y^{22}$, $Y^{23}$, $Y^{26}$ each represent a hydrogen atom, $Y^{15}$, $Y^{20}$, $Y^{21}$, $Y^{24}$, $Y^{25}$ each represent an $OC_5H_{11}$ group, $Y^{18}$ represents an $OCH_3$ group, and $Y^{17}$ represents a —O—$(CH_2CH_2O)_2CH_2CH_2$FG moiety.

A further aspect of the invention provides a luminescent compound are represented by the following general formula:

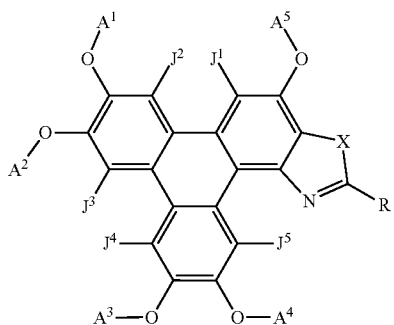

wherein X represents one of a nitrogen atom, an oxygen atom, a sulphur atom, a phosphorus atom, or a selenium atom;

R represents an aromatic group and/or an aliphatic group;

$J^1$, $J^2$, $J^3$, $J^4$, $J^5$ independently represent a hydrogen atom, a deuterium atom, a fluorine atom, a chlorine atom, a bromine atom, a substituted or unsubstituted alkyl group, a substituted or unsubstituted aryl group, a polyether chain, a polyglycol group (e.g. a substituted or unsubstituted group comprising a polyglycol moiety), an oxygen atom (e.g. a hydroxyl group or an alkylated oxygen atom forming an alkoxy group), a nitrogen atom (e.g. a primary, secondary, or tertiary amine group), a cyano group, a nitro group;

wherein $J^1$, $J^2$ may combine together to form a condensed ring (e.g. a condensed aromatic ring);

$A^1$, $A^2$, $A^3$, $A^4$, $A^5$ independently represents a hydrogen atom, a substituted or unsubstituted aryl group, a substituted or unsubstituted alkyl group, or a polyether group; and wherein one or more of $A^1$, $A^2$, $A^3$, $A^4$, $A^5$ comprises a functional group capable of forming a covalent bond with a second species.

In embodiments, the functional group may be selected from one or more of a carboxylic acid, an ester, an azide, an amine, a maleimide, a thiol, an isothiocyanate a carbonyl (e.g. an aldehyde or ketone), and/or an aliphatic alcohol.

In embodiments, $J^1$, $J^2$, $J^3$, $J^4$, $J^5$ independently represent a hydrogen atom. In embodiments, $J^1$, $J^2$, $J^3$, $J^4$, $J^5$ independently represent a deuterium atom.

In embodiments, R represents an aliphatic group or moiety. In embodiments, R represents an aromatic group or moiety.

In all embodiments, the term "condensed ring" is intended to define groups that bond together to form a ring (e.g. an aromatic ring, and/or a heterocyclic ring) that forms part of the core of the luminescent compound, that is, to expand the triphenylene core.

A yet further aspect of the invention provides a luminescent compound are represented by the following general formula:

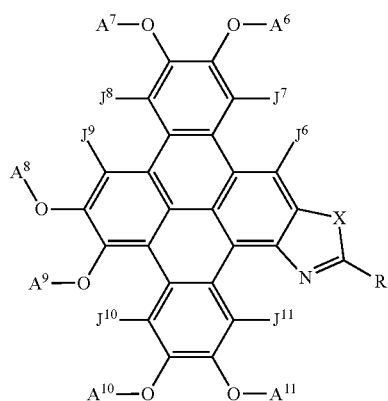

wherein X represents one of a nitrogen atom, an oxygen atom, a sulphur atom, a phosphorus atom, or a selenium atom;

R represents an aromatic group and/or an aliphatic group;

$J^5$, $J^6$, $J^7$, $J^8$, $J^9$, $J^{10}$, $J^{11}$ independently represents a hydrogen atom, a deuterium atom, a fluorine atom, a chlorine atom, a bromine atom, a substituted or unsubstituted alkyl group, a substituted or unsubstituted aryl group, a polyether chain, a polyglycol group (e.g. a substituted or unsubstituted group comprising a polyglycol moiety), an oxygen atom (e.g. a hydroxyl group or an alkylated oxygen atom forming an alkoxy group), a nitrogen atom (e.g. a primary, secondary, or tertiary amine group), a cyano group, a nitro group;

$J^6$ and $J^7$, or $J^8$ and $J^9$, may combine together to form a condensed ring (e.g. a condensed aromatic ring);

$A^6$, $A^7$, $A^8$, $A^9$, $A^{10}$, $A^{11}$ independently represents a hydrogen atom, a substituted or unsubstituted aryl group, a substituted or unsubstituted alkyl group, or a polyether group; and wherein one or more of $A^6$, $A^7$, $A^8$, $A^9$, $A^{10}$, $A^{11}$ comprises a functional group capable of forming a covalent bond with a second species.

A yet further aspect of the invention provides a luminescent compound represented by the following general formula:

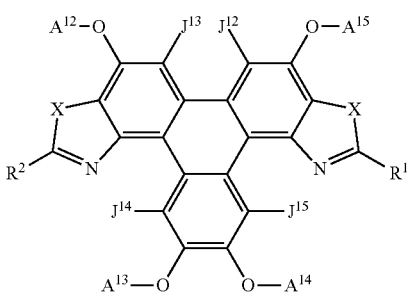

wherein X represents one of a nitrogen atom, an oxygen atom, a sulphur atom, a phosphorus atom, or a selenium atom;

$R^1$ and $R^2$ independently represents an aromatic group and/or an aliphatic group;

$J^{12}$, $J^{13}$, $J^{14}$, $J^{15}$ independently represents a hydrogen atom, a deuterium atom, a fluorine atom, a chlorine atom, a bromine atom, a substituted or unsubstituted alkyl group, a substituted or unsubstituted aryl group, a polyether chain, a polyglycol group (e.g. a substituted or unsubstituted group comprising a polyglycol moiety), an oxygen atom (e.g. a hydroxyl group or an alkylated oxygen atom forming an alkoxy group), a nitrogen atom (e.g. a primary, secondary, or tertiary amine group), a cyano group, a nitro group;

wherein $J^{12}$ and $J^{13}$ may combine together to form a condensed ring (e.g. a condensed aromatic ring);

$A^{12}$, $A^{13}$, $A^{14}$, $A^{15}$ independently represents a hydrogen atom, a substituted or unsubstituted aryl group, a substituted or unsubstituted alkyl group, or a polyether group; and wherein one or more of $A^{12}$, $A^{13}$, $A^{14}$, $A^{15}$ comprises a functional group capable of forming a covalent bond with a second species.

A yet further aspect of the invention provides a luminescent compound represented by the following general formula:

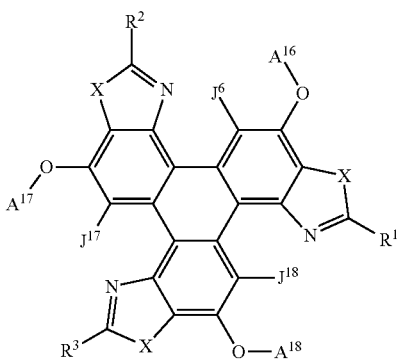

wherein X represents one of a nitrogen atom, an oxygen atom, a sulphur atom, a phosphorus atom, or a selenium atom;

$R^1$, $R^2$, $R^3$ independently represents an aromatic group and/or an aliphatic group;

$J^{16}$, $J^{17}$, $J^{18}$ independently represents a hydrogen atom, a deuterium atom, a fluorine atom, a chlorine atom, a bromine atom, a substituted or unsubstituted alkyl group, a substituted or unsubstituted aryl group, a polyether chain, a polyglycol group (e.g. a substituted or unsubstituted group comprising a polyglycol moiety), an oxygen atom (e.g. a hydroxyl group or an alkylated oxygen atom forming an alkoxy group), a nitrogen atom (e.g. a primary, secondary, or tertiary amine group), a cyano group, a nitro group;

$A^{16}$, $A^{17}$, $A^{18}$ independently represents a hydrogen atom, a substituted or unsubstituted aryl group, a substituted or unsubstituted alkyl group, or a polyether group; and wherein one or more of $A^{16}$, $A^{17}$, $A^{18}$ comprises a functional group capable of forming a covalent bond with a second species.

The functional group capable of forming a covalent bond with a second species may be selected from one of a carboxylic acid, an ester, an azide, an amine, a maleimide, a thiol, an isothiocyanate a carbonyl (e.g. an aldehyde or ketone), and/or an aliphatic alcohol.

In embodiments, the one or more of $A^1$, $A^2$, $A^3$, $A^4$, $A^5$ or one or more of $A^6$, $A^7$, $A^8$, $A^9$, $A^{10}$, $A^{11}$ or one or more of $A^{12}$, $A^{13}$, $A^{14}$, $A^{15}$ or one or more of $A^{16}$, $A^{17}$, $A^{18}$ that comprises a functional group capable of forming a covalent bond with a second species, may further comprise a spacing portion. The spacing portion may comprise a continuous chain of between 3 and 20 atoms, e.g. between 4 and 18 atoms, or 5 and 16 atoms, or 6 and 14 atoms, or 7 and 12 atoms, or 8 and 10 atoms, e.g. 9 atoms. The atoms may be selected from carbon atoms or a combination of carbon atoms and heteroatoms, e.g. oxygen atoms and/or nitrogen atoms.

In embodiments, the continuous chain of the spacing portion may comprise a continuous chain of one of 3, 4, 5, 6, 7, 8, 9, 10, 11, 12, 13, 14, 15, 16, 17, 18, 19, or 20 atoms.

The spacing portion of one or more of $A^1$, $A^2$, $A^3$, $A^4$, $A^5$ or one or more of $A^6$, $A^7$, $A^8$, $A^9$, $A^{10}$, $A^{11}$ or one or more of $A^{12}$, $A^{13}$, $A^{14}$, $A^{15}$ or one or more of $A^{16}$, $A^{17}$, $A^{18}$ may comprise or consist of a polyether chain, which is covalently bonded to the functional group capable of forming a covalent bond with a second species. For example, the spacing portion of one or more of one or more of $A^1$ to $A^{18}$ may comprise or consist of a polyether chain comprising a continuous chain of between five and twenty atoms, e.g. 5, 6, 7, 8, 9, 10, 11, 12, 13, 14, 15, 16, 17, 18, 19, or 20 atoms selected from carbon atoms and oxygen atoms. In embodiments, continuous chain of the spacing portion of one or more of $A^1$ to $A^{18}$ may comprise or consist of a polyether chain having a continuous chain of nine atoms selected from carbon and oxygen.

In embodiments, the functional group (FG) capable of forming a covalent bond with a second species may be located at the terminus of the spacing portion. For example, one or more of $A^1$ to $A^{18}$ may terminate in one of a carboxylic acid, an ester, an azide, an amine, a maleimide, a thiol, an isothiocyanate a carbonyl (e.g. an aldehyde or ketone), and/or an aliphatic alcohol.

In embodiments, the spacing portion may consist of a —(CH$_2$CH$_2$O)$_2$CH$_2$CH$_2$— moiety. In embodiments, the spacing portion may consist of a —(CH$_2$CH$_2$O)$_2$CH$_2$— moiety. The functional group (FG) capable of forming a covalent bond with a second species may be located at the terminus of the spacing portion, such that one or more of $A^1$, $A^2$, $A_3$, $A_4$, $A_5$ or one or more of $A_6$, $A_7$, $A_8$, $A^9$, $A^{10}$, $A^{11}$ or one or more of $A^{12}$, $A^{13}$, $A^{14}$, $A^{15}$ or one or more of $A^{16}$, $A^{17}$, $A^{18}$ consists of —(CH$_2$CH$_2$O)$_2$CH$_2$CH$_2$FG or —(CH$_2$CH$_2$O)$_2$CH$_2$FG.

Wherein one or more, or all except for one, of $A^1$, $A^2$, $A^3$, $A^4$, $A^5$ or one or more of $A^6$, $A^7$, $A^8$, $A^9$, $A^{10}$, $A^{11}$ or one or more of $A^{12}$, $A^{13}$, $A^{14}$, $A^{15}$ or one or more of $A^{16}$, $A^{17}$, $A^{18}$ do not comprise the spacing portion and the functional group capable of forming a covalent bond with a second species, one or more of $A^1$ to $A^{18}$ may comprise an alkyl group. The alkyl group(s) may be a straight or linear chain, or may comprise a branched chain, and/or may be further functionalised. Additionally or alternatively, $A^1$ to $A^{18}$ may independently comprise an aryl group. The aryl group(s) may be unsubstituted or may be further functionalised.

In embodiments, one or more, e.g. all apart from one, of $A^1, A^2, A^3, A^4, A^5$ or $A^6, A^7, A^8, A^9, A^{10}, A^{11}$ or $A^2, A^{13}, A^{14}, A^{15}$ or $A^{16}, A^{17}, A^{18}$ may comprise or consist of a straight chain alkyl group, e.g. independently selected from one or more of a $CH_3$, $C_2H_5$, $C_3H_7$, $C_4C_9$, $C_5H_{11}$, $C_6H_{13}$, $C_7H_{15}$, $C_8H_{17}$, $C_9H_{19}$, or $C_{10}H_{21}$ alkyl group.

In embodiments, $A^1$ to $A^{18}$ independently may comprise a polyether chain or polyglycol group, e.g. a polyethylene glycol moiety. The polyether chain or polyglycol chain may comprise a total of between 1 and 20 carbon and oxygen atoms, e.g. between 2 and 18 carbon and oxygen atoms, 3 and 17 carbon and oxygen atoms, 4 and 16 carbon and oxygen atoms, 5 and 15 carbon and oxygen atoms, 6 and 14 carbon and oxygen atoms, 7 and 13 carbon and oxygen atoms, 8 and 12 carbon and oxygen atoms, or between 9 and 11 carbon and oxygen atoms The luminescent compound of the invention may comprise a single functional group capable of forming a covalent bond with a second species, i.e. a single functional group selected from a carboxylic acid, an ester, an azide, an amine, a maleimide, a thiol, an isothiocyanate a carbonyl (e.g. an aldehyde or ketone), and/or an aliphatic alcohol. In alternative embodiments, the luminescent compound may comprise two, or more, functional groups capable of forming a covalent bond with a second species. For example, two or more of $A^1$ to $A^{18}$ may comprise a functional group capable of forming a covalent bond with a second species. In embodiments comprising more than one functional group capable of forming a covalent bond with a second species, the same type or a different type (i.e. a first type and a second type distinct from the first) of functional group may be selected.

In embodiments, R, $R^1$, $R^2$, and/or $R^3$ may be an alkyl group, for example, a straight or branched alkyl chain. In embodiments, at least one of R, $R^1$, $R^2$, $R^3$ may be a methyl, ethyl, propyl, butyl group.

In embodiments wherein R, $R^1$, $R^2$, and/or $R^3$ is an aromatic group, the aromatic group may be one of, or a combination of, an aromatic hydrocarbon group, and/or an aromatic heterocyclic group.

In embodiments wherein R, $R^1$, $R^2$, and/or $R^3$ is an aromatic hydrocarbon group, the aromatic hydrocarbon group may comprise one of, or a combination of, a phenyl ring and/or a substituted phenyl ring. There may be one, two, three, four, or five additional substituents on the phenyl ring. The substituents are bonded directly to the phenyl ring, and may be one of, or a combination of, fluorine, chlorine, bromine, iodine, a hydroxyl group, an amine group, a nitro group, an alkoxy group, a carboxylic acid, an amide, a cyano group, a trifluoromethyl, an ester, an alkene an alkyne, an azide, an azo, an isocyanate, a ketone, an aldehyde, an alkyl group consisting of a hydrocarbon chain, or a hydrocarbon ring, an alkyl group consisting of other heteroatoms such as fluorine, chlorine, bromine, iodine, oxygen, nitrogen, and/or sulphur. The alkyl group may comprise a hydroxyl group, an amine group, a nitro group, an ether group, a carboxylic acid, an amide, a cyano group, trifluoromethyl, an ester, an alkene an alkyne, an azide, an azo, an isocyanate, a ketone, an aldehyde, for example. The substituents may be another aromatic group, for example, R may comprise a phenyl substituted with a further phenyl ring. In embodiments, the R group may be a phenyl ring, substituted with a second phenyl ring, which in turn is substituted with a third phenyl ring. In embodiments, R, $R^1$, $R^2$, or $R^3$ may represent a p-fluorophenyl group, a m-fluorophenyl group, an o-fluorophenyl group, a thiophene group, a cyanophenyl moiety (e.g. a p-cyanophenyl moiety), a trifluoromethylphenyl moiety (e.g. a p-trifluoromethylphenyl moiety), an iodophenyl moiety (e.g. an o-iodophenyl moiety), a chlorophenyl moiety (e.g. an o-chlorophenyl moiety), a bromophenyl moiety (e.g. an o-bromophenyl moiety), an aminophenyl moiety (e.g. a mono-substituted or di-substituted or trisubstituted aminophenyl moiety), a nitrophenyl moiety (e.g. a p-nitrophenyl moiety), a phenol moiety.

In embodiments wherein R, $R^1$, $R^2$, and/or $R^3$ is an aromatic group, the aromatic group may be a polycyclic aromatic hydrocarbon, for example, naphthalene, anthracene, phenanthrene, tetracene, chrysene, triphenylene, pyrene, pentacene, benzo[a]pyrene, corannulene, benzo[ghi]perylene, coronene, ovalene, fullerene, and/or benzo[c]fluorene. The R, $R^1$, $R^2$, and/or $R^3$ group may be bonded to the triphenylene derivative by any isomer of the polycyclic aromatic hydrocarbons described, for example, 1-napthalene, 2-napthalene, 2-anthracene, 9-anthracene. The polycyclic aromatic hydrocarbon group may be substituted with other moieties such as aryl groups, alkyl groups, heteroatoms, and/or other electron withdrawing or electron donating groups.

In embodiments, R, $R^1$, $R^2$, and/or $R^3$ is naphthalene.

In embodiments wherein R, $R^1$, $R^2$, and/or $R^3$ is an aromatic heterocyclic group, the heterocyclic group may be a three membered ring, a four membered ring, a five membered ring, a six membered ring, a seven membered ring, an eight membered ring, a nine membered ring, a ten membered ring, or a fused ring. In embodiments, the heterocyclic group may be furan, benzofuran, isobenzofuran, pyrrole, indole, isoindole, thiophene, benzothiophene, benzo[c]thiophene, imidazole, benzimidazole, purine, pyrazole, indazole, oxazole, benzoxazole, isoxazole, benzisoxazole, thiazole, benzothiazole, pyridine, quinoline, isoquinoline, pyrazine, quinoxaline, acridine, pyrimidine, quinozoline, pyridazine, cinnoline, phthalazine, 1,2,3-triazine, 1,2,4-triazine, 1,3,5-triazine.pyridine or thiophene.

In embodiments wherein R, $R^1$, $R^2$, and/or $R^3$ is an aliphatic group, the aliphatic group may be one of, or a combination of, an n-alkyl chain, a branched alkyl chain, an alkyl chain comprising unsaturated moieties, an alkyl chain comprising heteroatoms, for example, fluorine, chlorine, bromine, iodine, oxygen, sulphur, nitrogen. The alkyl chain may comprise unsaturated portions, comprising alkenes, or aromatic moieties. The alkyl chain may comprise functional groups for further derivatisation of the polycyclic aromatic hydrocarbon, e.g. triphenylene, derivative. For example, the functional groups may be one or more of an azide, a carbonyl group, an alcohol, a halogen, an alkene, or a thioacetate.

In embodiments, R, $R^1$, $R^2$, and/or $R^3$ comprise a crown ether.

A yet further aspect of the invention provides any one of the luminescent compounds according to the invention covalently bonded to a second species.

In embodiments, the second species may be a small molecule and/or a biomolecule. For example, the second species may be an amino acid, a peptide, a protein, a nucleic acid, a polynucleotide. The second species need not be a molecule. For example, the second species may be an antibody. In embodiments, the second species is a therapeutic species or a pharmaceutically active molecule, e.g. a drug molecule.

Advantageously, the luminescent molecules according to the invention are suitable for being covalently bonded to a second species, e.g. a biomolecule or a small molecule or a drug molecule. Therefore, the luminescent molecules are usable as biosensors.

The biomolecule may be an antibody, e.g. monoclonal antibodies or polyclonal antibodies. The biomolecule may be an avidin, e.g. streptavidin. The biomolecule may be biotin.

In embodiments, the second species may be a molecule for recognition of a species in a biological system. For example, the biomolecule may be capable of binding to a protein or receptor on the surface of a cell.

A yet further aspect of the invention provides a biomolecule, e.g. an antibody, covalently bonded to any of the luminescent compounds of the invention.

A yet further aspect of the invention provides a kit of parts suitable for use in covalently bonding any of the luminescent compounds of the invention to a second species, e.g. a biomolecule, the kit of parts comprising one or more luminescent compound(s) of the invention and a solvent suitable for dissolving or suspending the luminescent compound(s).

The solvent may comprise water, for example, the solvent may be an aqueous media and/or a buffer solution. In embodiments, the solvent may comprise an organic solvent, for example, THF or DMSO or combinations thereof. In embodiments, the solvent may comprise a first solvent comprising an aqueous media and a second solvent comprising an organic solvent, e.g. THF or DMSO or combinations thereof.

In some embodiments, the kit of parts may further comprise the second species.

The kit of parts may further comprise a set of instructions that explain how to covalently bond the luminescent compound of the invention to a second species.

The kit of parts may further comprise a catalyst and/or a coupling agent for use in covalently bonding the luminescent compound of the invention to a second species.

The kit of parts may further comprise a measuring means, e.g. a pipette or pipette tips. The kit of part may further comprise a vessel suitable for carrying out the reaction of covalently bonding the luminescent compound to a second species.

A yet further aspect of the invention provides a method of conjugating the luminescent compound of the invention to a second species, the method comprising providing the luminescent molecule, providing a second species, and forming a covalent bond between the luminescent compound and the second species.

The method may comprise adding the second species, e.g. a solution or suspension of the second species, to a solution of the luminescent molecule. The method may comprise adding the luminescent molecule, e.g. a solution of the luminescent molecule, to a solution or suspension of the second species.

Advantageously, the luminescent compounds of the invention when conjugated (i.e. covalently bonded) to a second species are usable to locate and/or track the second species, e.g. in vivo. The conjugated luminescent molecule and second species may also be usable to locate and/or track a target species of the second species.

A yet further aspect of the invention provides use of one or more of the luminescent compounds according to the invention or conjugates thereof, in a composition for cell or tissue imaging.

By conjugates of the luminescent molecule, we mean the luminescent compound when covalently bonded to a second species.

A yet further aspect of the invention provides use of the luminescent compound or conjugates thereof in an immunofluorescence technique.

A yet further aspect of the invention provides use of the luminescent compound or conjugates thereof in flow cytometry.

The luminescent species and conjugates thereof may be used to quantify and/or detect the presence of, or the target of, the second species, e.g. in an assay. The luminescent species and conjugates thereof may be used to quantify and/or detect the presence of a biomolecule, e.g. DNA, RNA, a protein, a hormone, an antibody, or a cell. In this way, the luminescent compound and conjugates thereof may be used as biosensors.

The luminescent compounds according to the invention may be used to form covalent bonds with a second species present in vivo or in vitro. For example, the covalently bond between the luminescent compound and the second species may be formed in a tissue culture, or a cell culture, e.g. a plant, animal, or microbial cell culture.

The conjugates of the luminescent compounds of the invention to a second species may be usable in vivo, for example, to track or locate the second species in vivo, or to track or locate a target of the second species in vivo. The conjugates of the luminescent compounds may be usable to produce an image, e.g. of an organ in which the conjugates have accumulated. The image, e.g. produced using a fluorescence imaging technique, may be usable in the diagnosis of a disease.

More advantageously, the luminescent molecules according to the invention are tunable. It has been surprisingly found that modification of the R group provides a series of luminescent compounds that require the same excitation wavelength but exhibit different emission spectra. Even more advantageously, the luminescent compounds of the invention may be designed to emit wavelengths across the entire visible spectrum by varying the structure of the R group.

Additionally, the luminescent compounds of the invention may be used in a multiplexed system. For example, two or more luminescent molecules according to the invention may be conjugated to respective second species. The luminescent molecules are able to be excited at the same wavelengths but may emit at different wavelengths. This enables two different second species, e.g. biomolecules, to be studied, e.g. in a biological system, whilst using a single light source. For example, two or more different luminescent compounds according to the invention may be used to observe or track two different second species, e.g. biomolecules, in a system, e.g. in vivo or ex vivo.

It has also been surprisingly found that the luminescent compounds of the invention may be usable with multiphoton excitation microscopy. As is known in the art, in multiphoton microscopy (also known as two-photon microscopy) two or more photons of light are absorbed for each excitation. This technique differs from traditional fluorescence microscopy in which the excitation wavelength is shorter than the emission wavelength. Two-photon excitation microscopy typically uses near-infrared excitation light. In some embodiments, multiphoton microscopy is carried out by irradiating the luminescent compound, e.g. the conjugated luminescent compound, using a light source which emits a wavelength in the range of from 500 to 1000 nm, or from 800 to 900 nm. The use of multiphoton microscopy is advantageous since it uses lower energy light and is thus less damaging to biological samples. Advantageously, this prevents or mitigates phototoxicity when the luminescent molecules are used in living systems. More advantageously, the light penetrates deeper through tissues and is less likely to photobleach the luminescent compound.

The luminescent compound(s) may emit light in the visible spectrum, i.e. between 380 nm and 750 nm and/or may exhibit a Stokes shift of between 8000 cm$^{-1}$ to 25,000 cm$^{-1}$, for example, between 15,000 cm$^{-1}$ to 25,000 cm$^{-1}$. In embodiments, the luminescent compound(s) may exhibit a conductivity value of $5.0 \times 10^{-13}$ S cm$^{-1}$ and $1.5 \times 10^{-11}$ S cm$^{-1}$, for example, between $6 \times 10^{-12}$ S cm$^-$ and $1.5 \times 10^{-11}$ S cm$^{-1}$. The luminescent compound(s) may exhibit a photoconductivity when irradiated at 350 nm of between $1.5 \times 10^{-10}$ S cm$^{-1}$ and $1 \times 10^{-3}$ S cm$^{-1}$, for example, between $1 \times 10^{-8}$ S cm$^{-1}$ and $1 \times 10^{-3}$ cm$^{-1}$.

The luminescent compounds of the invention may be any of those shown in the Examples of the invention, i.e. any one or combination of Compounds 38 to 43.

Accordingly, a further aspect of the invention provides a luminescent molecule represented by the following general formula:

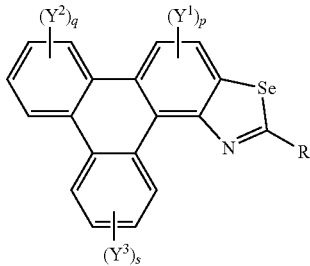

wherein R represents an aromatic group and/or an aliphatic group;

p is an integer of 1 or 2;

q and s are independently integers of 1, 2, 3, or 4;

$Y^1$, $Y^2$, and $Y^3$ independently represent a hydrogen atom, a deuterium atom, a fluorine atom, a chlorine atom, a bromine atom, a substituted or unsubstituted alkyl group, a substituted or unsubstituted aryl group, a polyether chain, a polyglycol group (e.g. a substituted or unsubstituted group comprising a polyglycol moiety), an oxygen atom (e.g. a hydroxyl group or an alkylated oxygen atom forming an alkoxy group), a nitrogen atom (e.g. a primary, secondary, or tertiary amine group), a cyano group, a nitro group;

$Y^1$, $Y^2$, and/or $Y^3$ may combine together to form a condensed ring (e.g. a condensed aromatic ring).

In embodiments, the luminescent compound is a triphenylene derivative, that is, the luminescent compound comprises a triphenylene core. In embodiments, luminescent compound comprises a core comprising a polycyclic aromatic hydrocarbon, e.g. comprising five, six, seven, eight, nine, ten, eleven, twelve, thirteen, fourteen, fifteen, sixteen, seventeen, eighteen, nineteen, or twenty or more fused 6-membered rings. For example, the luminescent compound may comprise a core comprising a polycyclic aromatic hydrocarbon comprising six fused 6-membered rings.

In embodiments, the luminescent molecule is represented by the following general formula:

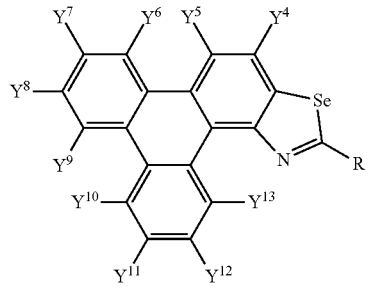

wherein R represents an aromatic group and/or an aliphatic group;

$Y^4$, $Y^5$, $Y^6$, $Y^7$, $Y^8$, $Y^9$, $Y^{10}$, $Y^{11}$, $Y^{12}$, $Y^{13}$ independently represent a hydrogen atom, a deuterium atom, a fluorine atom, a chlorine atom, a bromine atom, a substituted or unsubstituted alkyl group, a substituted or unsubstituted aryl group, a polyether chain, a polyglycol group (e.g. a substituted or unsubstituted group comprising a polyglycol moiety), an oxygen atom (e.g. a hydroxyl group or an alkylated oxygen atom forming an alkoxy group), a nitrogen atom (e.g. a primary, secondary, or tertiary amine group), a cyano group, a nitro group; two or more of $Y^4$, $Y^5$, $Y^6$, $Y^7$, $Y_8$, $Y^9$, $Y^{10}$, $Y^{11}$, $Y^{12}$, $Y^{13}$ may combine together to form a condensed ring (e.g. a condensed aromatic ring).

In embodiments, one or more or all of $Y^1$ to $Y^{13}$ may represent or comprise an alkyl group. The alkyl group(s) may be a straight or linear chain, or may comprise a branched chain, and/or may be further functionalised. The alkyl chain may comprise between 1 and 20 carbon atoms, e.g. between 2 and 18 carbon atoms, 3 and 17 carbon atoms, 4 and 16 carbon atoms, 5 and 15 carbon atoms, 6 and 14 carbon atoms, 7 and 13 carbon atoms, 8 and 12 carbon atoms, or between 9 and 11 carbon atoms.

Additionally or alternatively, $Y^1$ to $Y^3$, or $Y^4$ to $Y^{13}$ may independently represent or comprise an aryl group. The aryl group(s) may be unsubstituted or may be further functionalised. In embodiments, $Y^1$ to $Y^3$, or $Y^4$ to $Y^{13}$ independently may represent or comprise a polyether chain or polyglycol group, e.g. a polyethylene glycol moiety. The polyether chain or polyglycol chain may comprise a total of between 1 and 20 carbon and oxygen atoms, e.g. between 2 and 18 carbon and oxygen atoms, 3 and 17 carbon and oxygen atoms, 4 and 16 carbon and oxygen atoms, 5 and 15 carbon and oxygen atoms, 6 and 14 carbon and oxygen atoms, 7 and 13 carbon and oxygen atoms, 8 and 12 carbon and oxygen atoms, or between 9 and 11 carbon and oxygen atoms In embodiments, one or more or all of $Y^1$ to $Y^3$, or $Y^4$ to $Y^{13}$, may independently represent or comprise an alkoxy group, e.g. an OR' group wherein R' is a straight or branched alkyl chain. In embodiments, one or more or all of $Y^1$ to $Y^3$, or $Y^4$ to $Y^{13}$ may comprise or consist of a straight chain alkoxy group, e.g. selected from one or more of a OCH$_3$, OC$_2$H$_5$, OC$_3$H$_7$, OC$_4$H$_9$, OC$_5$H$_{11}$, OC$_6$H$_{13}$, OC$_7$H$_{15}$, OC$_8$H$_{17}$, OC$_9$H$_{19}$, or OC$_{10}$H$_{21}$ alkyl group.

In embodiments, one or more or all of $Y^5$, $Y^6$, $Y^9$, $Y^{10}$, $Y^{13}$ each represent a hydrogen atom.

In embodiments, $Y^4$, $Y^7$, $Y^8$, $Y^{11}$, $Y^{12}$, are each represent an OR' group. For example, $Y^4$, $Y^7$, $Y^8$, $Y^{11}$ may each represent an OC$_5$H$_{11}$ group.

In embodiments, the luminescent compound is represented by the following general formula:

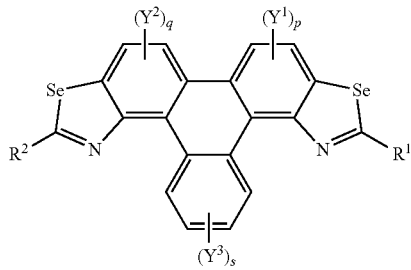

wherein $R^1$ and $R^2$ independently represents an aromatic group and/or an aliphatic group;
p and q are independently an integer of 1 to 2;
s is an integer of 1 to 4;
$Y^1$, $Y^2$, and $Y^3$ independently represent a hydrogen atom, a deuterium atom, a fluorine atom, a chlorine atom, a bromine atom, a substituted or unsubstituted alkyl group, a substituted or unsubstituted aryl group, a polyether chain, a polyglycol group (e.g. a substituted or unsubstituted group comprising a polyglycol moiety), an oxygen atom (e.g. a hydroxyl group or an alkylated oxygen atom forming an alkoxy group), a nitrogen atom (e.g. a primary, secondary, or tertiary amine group), a cyano group, a nitro group;
$Y^1$, $Y^2$, or $Y^3$ may combine together to form a condensed ring (e.g. a condensed aromatic ring).

In embodiments, the luminescent compound is represented by the following general formula:

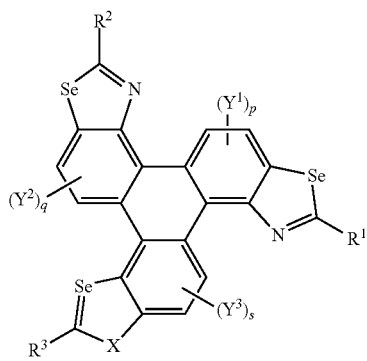

wherein $R^1$, $R^2$, $R^3$ independently represent an aromatic group and/or an aliphatic group;
p, q, and s are each independently an integer of 1 to 2;
$Y^1$, $Y^2$, and $Y^3$ independently represent a hydrogen atom, a deuterium atom, a fluorine atom, a chlorine atom, a bromine atom, a substituted or unsubstituted alkyl group, a substituted or unsubstituted aryl group, a polyether chain, a polyglycol group (e.g. a substituted or unsubstituted group comprising a polyglycol moiety), an oxygen atom (e.g. a hydroxyl group or an alkylated oxygen atom forming an alkoxy group), a nitrogen atom (e.g. a primary, secondary, or tertiary amine group), a cyano group, a nitro group.
Preferably, $R^1$, $R^2$, $R^3$ represent the same type of group, e.g. $R^1$, $R^2$, $R^3$ may each represent a naphthalene group.

In embodiments, the luminescent compound may be represented by the following general formula:

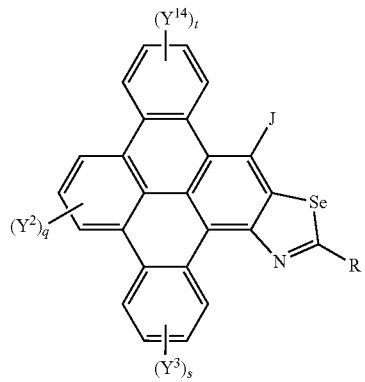

wherein R independently represents an aromatic group and/or an aliphatic group;
q is independently an integer of 1 to 3;
s is independently an integer of 1 to 4;
t is independently an integer of 1 to 4;
$Y^2$, $Y^3$, and $Y^{14}$ and J independently represent a hydrogen atom, a deuterium atom, a fluorine atom, a chlorine atom, a bromine atom, a substituted or unsubstituted alkyl group, a substituted or unsubstituted aryl group, a polyether chain, a polyglycol group (e.g. a substituted or unsubstituted group comprising a polyglycol moiety), an oxygen atom (e.g. a hydroxyl group or an alkylated oxygen atom forming an alkoxy group), a nitrogen atom (e.g. a primary, secondary, or tertiary amine group), a cyano group, a nitro group;
$Y^2$, $Y^3$, and/or $Y^{14}$ may combine together to form a condensed ring (e.g. a condensed aromatic ring).

In embodiments, the luminescent compound may be represented by the following general formula:

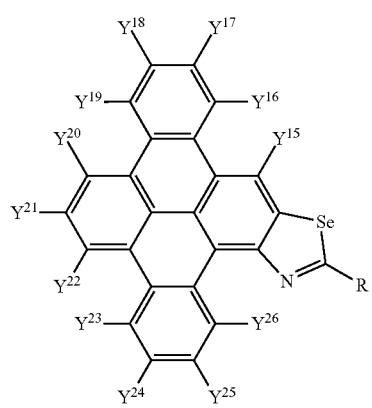

wherein R independently represents an aromatic group and/or an aliphatic group;
$Y^{15}$, $Y^{16}$, $Y^{17}$, $Y^{18}$, $Y^{19}$, $Y^{20}$, $Y^{21}$, $Y^{22}$, $Y^{23}$, $Y^{24}$, $Y^{25}$, $Y^{26}$ independently represent a hydrogen atom, a deuterium atom, a fluorine atom, a chlorine atom, a bromine atom, a substituted or unsubstituted alkyl group, a substituted or unsubstituted aryl group, a polyether chain, a polyglycol group (e.g. a substituted or unsubstituted group comprising a polyglycol moiety), an oxygen atom (e.g. a hydroxyl group or an alkylated oxygen atom forming an alkoxy group), a nitrogen atom (e.g. a primary, secondary, or tertiary amine group), a cyano group, a nitro group;

two or more of $Y^{15}$, $Y^{16}$, $Y^{17}$, $Y^{18}$, $Y^{19}$, $Y^{20}$, $Y^{21}$, $Y^{22}$, $Y^{23}$, $Y^{24}$, $Y^{25}$, $Y^{26}$ combine together to form a condensed ring (e.g. a condensed aromatic ring).

In embodiments, $Y^{15}$, $Y^{16}$, $Y^{17}$, $Y^{18}$, $Y^{19}$, $Y^{20}$, $Y^{21}$, $Y^{22}$, $Y^{23}$, $Y^{24}$, $Y^{25}$, $Y^{26}$ may independently represent or comprise an alkyl group. The alkyl group(s) may be a straight or linear chain, or may comprise a branched chain, and/or may be further functionalised. Additionally or alternatively, $Y^{15}$, $Y^{16}$, $Y^{17}$, $Y^{18}$, $Y^{19}$, $Y^{20}$, $Y^{21}$, $Y^{22}$, $Y^{23}$, $Y^{24}$, $Y^{25}$, $Y^{26}$ may independently represent or comprise an aryl group. The aryl group(s) may be unsubstituted or may be further functionalised. In embodiments, $Y^{15}$, $Y^{16}$, $Y^{17}$, $Y^{18}$, $Y^{19}$, $Y^{20}$, $Y^{21}$, $Y^{22}$, $Y^{23}$, $Y^{24}$, $Y^{25}$, $Y^{26}$, may independently represent or comprise a polyether chain or polyglycol group, e.g. a polyethylene glycol moiety. The polyether chain or polyglycol chain may comprise a total of between 1 and 20 carbon and oxygen atoms, e.g. between 2 and 18 carbon and oxygen atoms, 3 and 17 carbon and oxygen atoms, 4 and 16 carbon and oxygen atoms, 5 and 15 carbon and oxygen atoms, 6 and 14 carbon and oxygen atoms, 7 and 13 carbon and oxygen atoms, 8 and 12 carbon and oxygen atoms, or between 9 and 11 carbon and oxygen atoms.

In embodiments, one or more of $Y^{15}$, $Y^{16}$, $Y^{17}$, $Y^{18}$, $Y^{19}$, $Y^{20}$, $Y^{21}$, $Y^{22}$, $Y^{23}$, $Y^{24}$, $Y^{25}$, $Y^{26}$, may independently represent or comprise an alkoxy group, e.g. an OR' group wherein R' is a straight or branched alkyl chain. The alkyl chain may comprise between 1 and 20 carbon atoms, e.g. between 2 and 18 carbon atoms, 3 and 17 carbon atoms, 4 and 16 carbon atoms, 5 and 15 carbon atoms, 6 and 14 carbon atoms, 7 and 13 carbon atoms, 8 and 12 carbon atoms, or between 9 and 11 carbon atoms.

In embodiments, one or more or all of $Y^{15}$, $Y^{16}$, $Y^{17}$, $Y^{18}$, $Y^{19}$, $Y^{20}$, $Y^{21}$, $Y^{22}$, $Y^{23}$, $Y^{24}$, $Y^{25}$, $Y^{26}$ may comprise a straight chain alkoxy group, e.g. selected from one or more of a $OCH_3$, $OC_2H_5$, $OC_3H_7$, $OC_4H_9$, $OC_5H_{11}$, $OC_6H_{13}$, $OC_7H_{15}$, $OC_8H_{17}$, $OC_9H_{19}$, or $OC_{10}H_{21}$ alkyl group.

In embodiments, one or more or all of $Y^{16}$, $Y^{19}$, $Y^{22}$, $Y^{23}$, $Y^{26}$ each represent a hydrogen atom.

In embodiments, one or more or all of $Y^{15}$, $Y^{17}$, $Y^{18}$, $Y^{20}$, $Y^{21}$, $Y^{24}$, $Y^{25}$ each represent an OR' group. For example, $Y^{15}$, $Y^{20}$, $Y^{21}$, $Y^{24}$, $Y^{25}$ may each represent an $OC_5H_{11}$ group. For example, $Y^{17}$, $Y^{18}$ may each represent an $OCH_3$ group.

For example, $Y^{16}$, $Y^{19}$, $Y^{22}$, $Y^{23}$, $Y^{26}$ each represent a hydrogen atom, $Y^{15}$, $Y^{20}$, $Y^{21}$, $Y^{24}$, $Y^{25}$ each represent an $OC_5H_{11}$ group, $Y^{17}$, $Y^{18}$ represents an $OCH_3$ group.

A further aspect of the invention provides a luminescent compound are represented by the following general formula:

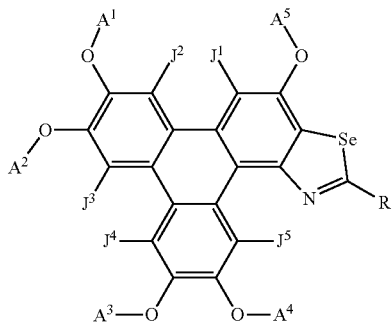

wherein R represents an aromatic group and/or an aliphatic group;

$J^1$, $J^2$, $J^3$, $J^4$, $J^5$ independently represent a hydrogen atom, a deuterium atom, a fluorine atom, a chlorine atom, a bromine atom, a substituted or unsubstituted alkyl group, a substituted or unsubstituted aryl group, a polyether chain, a polyglycol group (e.g. a substituted or unsubstituted group comprising a polyglycol moiety), an oxygen atom (e.g. a hydroxyl group or an alkylated oxygen atom forming an alkoxy group), a nitrogen atom (e.g. a primary, secondary, or tertiary amine group), a cyano group, a nitro group;

wherein $J^1$ and $J^2$, or $J^3$ and $J^4$ may combine together to form a condensed ring (e.g. a condensed aromatic ring);

$A^1$, $A^2$, $A^3$, $A^4$, $A^5$ independently represents a hydrogen atom, a substituted or unsubstituted aryl group, a substituted or unsubstituted alkyl group, or a polyether group.

In all embodiments, the term "condensed ring" is intended to define groups that bond together to form a ring (e.g. an aromatic ring, and/or a heterocyclic ring) that forms part of the core of the luminescent compound, that is, to expand the triphenylene core.

A yet further aspect of the invention provides a luminescent compound are represented by the following general formula:

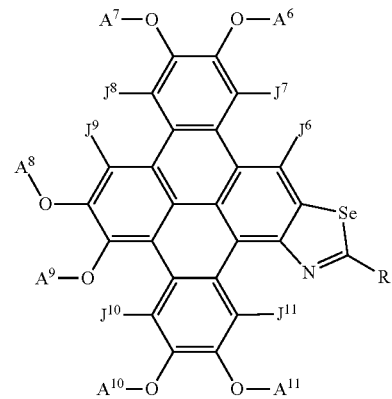

wherein R represents an aromatic group and/or an aliphatic group;

$J^6$, $J^7$, $J^8$, $J^9$, $J^{10}$, $J^{11}$ independently represents a hydrogen atom, a deuterium atom, a fluorine atom, a chlorine atom, a bromine atom, a substituted or unsubstituted alkyl group, a substituted or unsubstituted aryl group, a polyether chain, a polyglycol group (e.g. a substituted or unsubstituted group comprising a polyglycol moiety), an oxygen atom (e.g. a hydroxyl group or an alkylated oxygen atom forming an alkoxy group), a nitrogen atom (e.g. a primary, secondary, or tertiary amine group), a cyano group, a nitro group;

wherein $J^6$ and $J^7$, and/or $J^8$ and $J^9$, may combine together to form a condensed ring (e.g. a condensed aromatic ring);

$A^6$, $A^7$, $A^8$, $A^{10}$, $A^{11}$ independently represents a hydrogen atom, a substituted or unsubstituted aryl group, a substituted or unsubstituted alkyl group, or a polyether group.

A yet further aspect of the invention provides a luminescent compound represented by the following general formula:

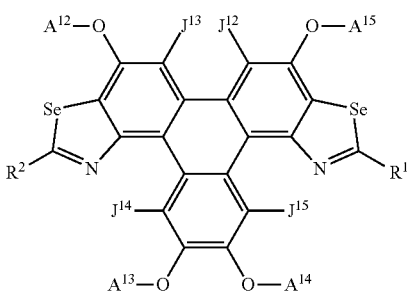

wherein $R^1$ and $R^2$ independently represents an aromatic group and/or an aliphatic group;

$J^{12}$, $J^{13}$, $J^{14}$, $J^{15}$ independently represents a hydrogen atom, a deuterium atom, a fluorine atom, a chlorine atom, a bromine atom, a substituted or unsubstituted alkyl group, a substituted or unsubstituted aryl group, a polyether chain, a polyglycol group (e.g. a substituted or unsubstituted group comprising a polyglycol moiety), an oxygen atom (e.g. a hydroxyl group or an alkylated oxygen atom forming an alkoxy group), a nitrogen atom (e.g. a primary, secondary, or tertiary amine group), a cyano group, a nitro group;

wherein $J^{12}$ and $J^{13}$ may combine together to form a condensed ring (e.g. a condensed aromatic ring);

$A^{12}$, $A^{13}$, $A^{14}$, $A^{15}$ independently represents a hydrogen atom, a substituted or unsubstituted aryl group, a substituted or unsubstituted alkyl group, or a polyether group.

A yet further aspect of the invention provides a luminescent compound represented by the following general formula:

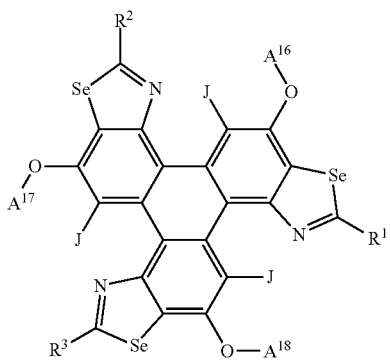

wherein $R^1$, $R^2$, $R^3$ independently represents an aromatic group and/or an aliphatic group; J independently represents a hydrogen atom, a deuterium atom, a fluorine atom, a chlorine atom, a bromine atom, a substituted or unsubstituted alkyl group, a substituted or unsubstituted aryl group, a polyether chain, a polyglycol group (e.g. a substituted or unsubstituted group comprising a polyglycol moiety), an oxygen atom (e.g. a hydroxyl group or an alkylated oxygen atom forming an alkoxy group), a nitrogen atom (e.g. a primary, secondary, or tertiary amine group), a cyano group, a nitro group;

$A^{16}$, $A^{17}$, $A^{18}$ independently represents a hydrogen atom, a substituted or unsubstituted aryl group, a substituted or unsubstituted alkyl group, or a polyether group.

In embodiments, the one or more or all of $A^1$ to $A^{18}$ may comprise an alkyl group. The alkyl group(s) may be a straight or linear chain, or may comprise a branched chain, and/or may be further functionalised. Additionally or alternatively, $A^1$ to $A^{18}$ may independently comprise an aryl group. The aryl group(s) may be unsubstituted or may be further functionalised.

In embodiments, one or more or all of $A^1$ to $A^{18}$ may comprise or consist of a straight chain alkyl group, e.g. selected from one or more of a $CH_3$, $C_2H_5$, $C_3H_7$, $C_4H_9$, $C_5H_{11}$, $C_6H_{13}$, $C_7H_{15}$, $C_8H_{17}$, $C_9H_{19}$, or $C_{10}H_{21}$ alkyl group.

In embodiments, one or more or all of $A^1$ to $A^{18}$ independently may comprise a polyether chain or polyglycol group, e.g. a polyethylene glycol moiety. The polyether chain or polyglycol chain may comprise a total of between 1 and 20 carbon and oxygen atoms, e.g. between 2 and 18 carbon and oxygen atoms, 3 and 17 carbon and oxygen atoms, 4 and 16 carbon and oxygen atoms, 5 and 15 carbon and oxygen atoms, 6 and 14 carbon and oxygen atoms, 7 and 13 carbon and oxygen atoms, 8 and 12 carbon and oxygen atoms, or between 9 and 11 carbon and oxygen atoms In embodiments, one or more or all of J, or $J^1$ to $J^{15}$, may independently represent a hydrogen atom. In embodiments, one or more of all of A, or $A^1$ to $A^{18}$ may independently represent a linear or branched alkyl group. In embodiments, one or more of all of A, or $A^1$ to $A^{18}$ may independently represent a linear alkyl chain comprising between 1 and 20 carbon atoms, e.g. 20, 19, 18, 17, 16, 15, 14, 13, 12, 11, 10, 9, 8, 7, 6, 5, 4, 3, 2, 1 carbon atoms. In embodiments, one or more of all of A, or $A^1$ to $A^{18}$ may independently represent $CH_3$, $C_2H_5$, $C_3H_7$, $C_4H_9$, $C_5H_{11}$, $C_6H_{13}$, $C_7H_{15}$, $C_8H_{17}$, $C_9H_{19}$, and/or $C_{10}H_{21}$.

For example, in embodiments, $J^1$, $J^2$, $J^3$, $J^4$, $J^5$ each represent a hydrogen atom, and $A^1$, $A^2$, $A^3$, $A^4$, $A^5$ each represent an alkyl chain, e.g. a $C_5H_{11}$ moiety.

For example, in embodiments, $J^6$ to $J^{11}$ each represent a hydrogen atom, and $A^6$ to $A^{11}$ each represent an alkyl chain, e.g. a $C_5H_{11}$ moiety.

In embodiments, R, $R^1$, $R^2$, or $R^3$ may be an alkyl group, for example, a straight or branched alkyl chain. In embodiments, at least one of R, $R^1$, $R^2$, $R^3$ may be a methyl, ethyl, propyl, butyl group.

In embodiments wherein R, $R^1$, $R^2$, or $R^3$ is an aromatic group, the aromatic group may be one of, or a combination of, an aromatic hydrocarbon group, and/or an aromatic heterocyclic group.

In embodiments wherein R, $R^1$, $R^2$, or $R^3$ is an aromatic hydrocarbon group, the aromatic hydrocarbon group may comprise one of, or a combination of, a phenyl ring and/or a substituted phenyl ring. There may be one, two, three, four, or five additional substituents on the phenyl ring. The substituents are bonded directly to the phenyl ring, and may be one of, or a combination of, fluorine, chlorine, bromine, iodine, a hydroxyl group, an amine group, a nitro group, an alkoxy group, a carboxylic acid, an amide, a cyano group, a trifluoromethyl, an ester, an alkene an alkyne, an azide, an azo, an isocyanate, a ketone, an aldehyde, an alkyl group consisting of a hydrocarbon chain, or a hydrocarbon ring, an alkyl group consisting of other heteroatoms such as fluorine, chlorine, bromine, iodine, oxygen, nitrogen, and/or sulphur. The alkyl group may comprise a hydroxyl group, an amine group, a nitro group, an ether group, a carboxylic acid, an amide, a cyano group, trifluoromethyl, an ester, an alkene an alkyne, an azide, an azo, an isocyanate, a ketone, an aldehyde, for example. The substituents may be another aromatic group, for example, R may comprise a phenyl substituted with a further phenyl ring. In embodiments, the R group may be a phenyl ring, substituted with a second phenyl ring, which in turn is substituted with a third phenyl ring. In embodiments, R, $R^1$, $R^2$, or $R^3$ may represent a p-fluorophenyl group, a m-fluorophenyl group, an o-fluorophenyl group, a thiophene group, a cyanophenyl moiety (e.g. a p-cyanophenyl moiety), a trifluoromethylphenyl moiety (e.g. a p-trifluoromethylphenyl moiety), an iodophenyl moiety (e.g. an o-iodophenyl moiety), a chlorophenyl moiety (e.g. an o-chlorophenyl moiety), a bromophenyl moiety (e.g. an o-bromophenyl moiety), an aminophenyl moiety (e.g. a mono-substituted or di-substituted or trisubstituted aminophenyl moiety), a nitrophenyl moiety (e.g. a p-nitrophenyl moiety), a phenol moiety.

In embodiments wherein R, $R^1$, $R^2$, or $R^3$ is an aromatic group, the aromatic group may be a polycyclic aromatic hydrocarbon, for example, naphthalene, anthracene, phenanthrene, tetracene, chrysene, triphenylene, pyrene, pentacene, benzo[a]pyrene, corannulene, benzo[ghi]perylene, coronene, ovalene, fullerene, and/or benzo[c]fluorene. The R group may be bonded to the triphenylene derivative by any isomer of the polycyclic aromatic hydrocarbons described, for example, 1-napthalene, 2-napthalene, 2-anthracene, 9-anthracene. The polycyclic aromatic hydrocarbon group may be substituted with other moieties such as aryl groups, alkyl groups, heteroatoms, and/or other electron withdrawing or electron donating groups.

In embodiments wherein R, $R^1$, $R^2$, or $R^3$ is an aromatic heterocyclic group, the heterocyclic group may be a three membered ring, a four membered ring, a five membered ring, a six membered ring, a seven membered ring, an eight membered ring, a nine membered ring, a ten membered ring, or a fused ring. In embodiments, the heterocyclic group may be furan, benzofuran, isobenzofuran, pyrrole, indole, isoindole, thiophene, benzothiophene, benzo[c]thiophene, imidazole, benzimidazole, purine, pyrazole, indazole, oxazole, benzoxazole, isoxazole, benzisoxazole, thiazole, benzothiazole, pyridine, quinoline, isoquinoline, pyrazine, quinoxaline, acridine, pyrimidine, quinozoline, pyridazine, cinnoline, phthalazine, 1,2,3-triazine, 1,2,4-triazine, 1,3,5-triazine.pyridine or thiophene.

In embodiments wherein R, $R^1$, $R^2$, or $R^3$ is an aliphatic group, the aliphatic group may be one of, or a combination of, an n-alkyl chain, a branched alkyl chain, an alkyl chain comprising unsaturated moieties, an alkyl chain comprising heteroatoms, for example, fluorine, chlorine, bromine, iodine, oxygen, sulphur, nitrogen. The alkyl chain may comprise unsaturated portions, comprising alkenes, or aromatic moieties. The alkyl chain may comprise functional groups for further derivatisation of the polycyclic aromatic hydrocarbon, e.g. triphenylene, derivative. For example, the functional groups may be one or more of an azide, a carbonyl group, an alcohol, a halogen, an alkene, or a thioacetate.

In embodiments, R, $R^1$, $R^2$, or $R^3$ comprise a crown ether.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. For the avoidance of doubt, the terms "may", "and/or", "e.g.", "for example" and any similar term as used herein should be interpreted as non-limiting such that any feature so-described need not be present. Indeed, any combination of optional features is expressly envisaged without departing from the scope of the invention, whether or not these are expressly claimed. The applicant reserves the right to change any originally filed claim or file any new claim accordingly, including the right to amend any originally filed claim to depend from and/or incorporate any feature of any other claim although not originally claimed in that manner.

To further exemplify the invention, reference is also made to the following non-limiting Examples, in which reference to the accompanying drawings.

Figure 1:
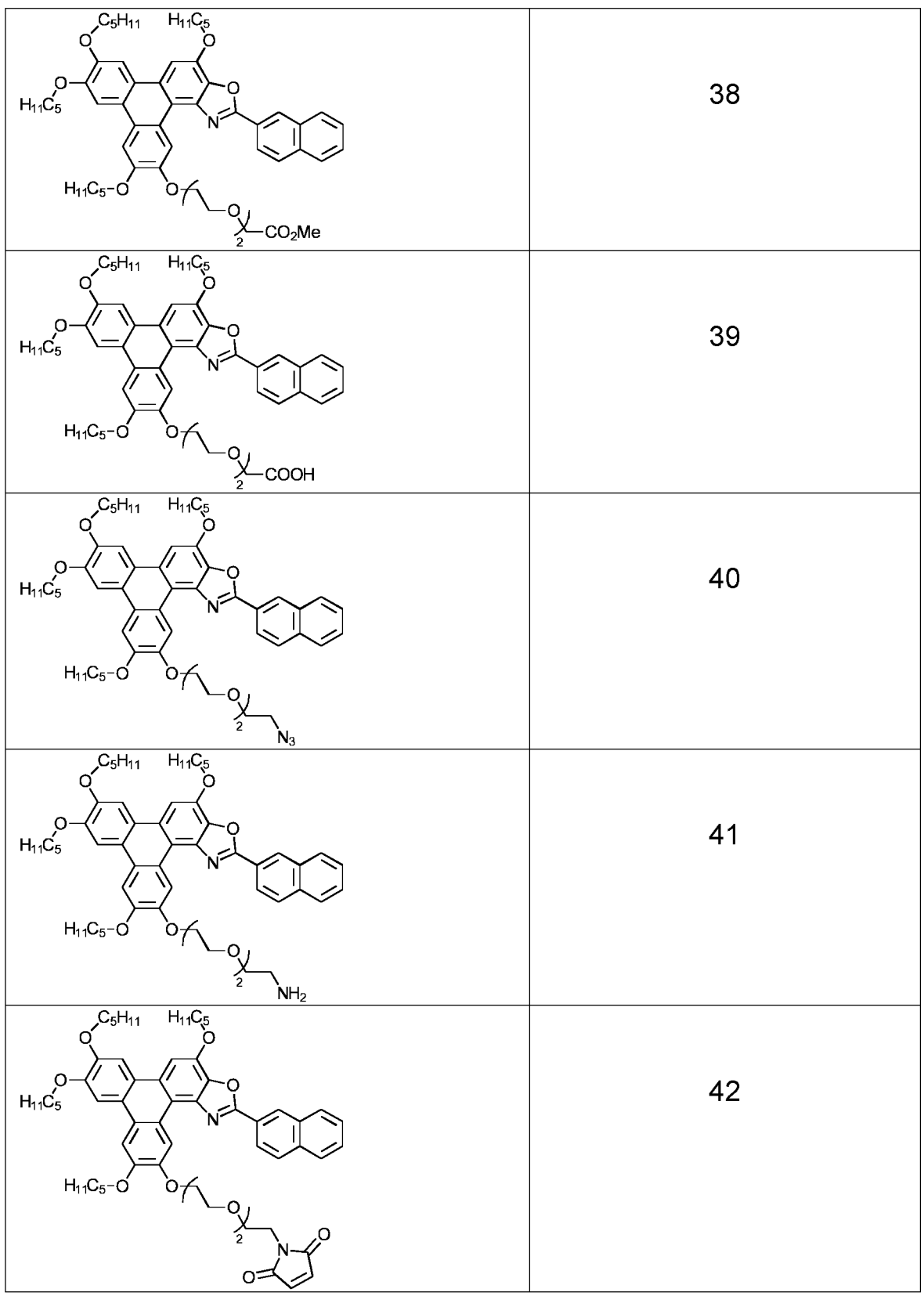
FIG. 1 is a table illustrating the structures of the luminescent compounds according to Examples of the invention.
Figure 1:
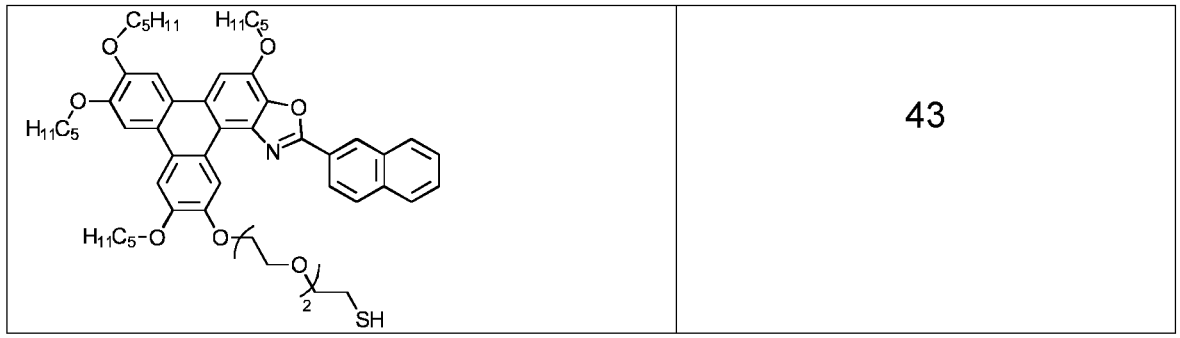
Figure 2:
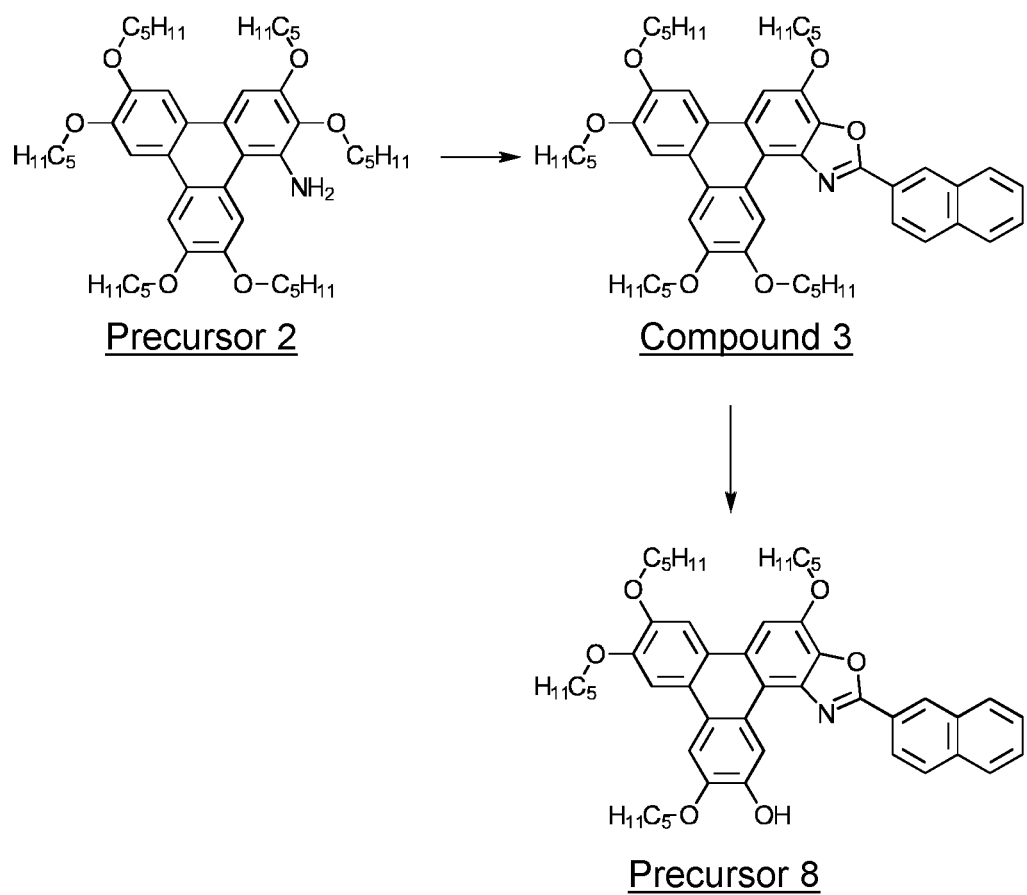
FIG. 2 is a synthetic route to the precursors used to produce compounds according to Examples of the invention.

Referring now to FIG. 2, there is shown a synthetic route to the precursors used to produce the compounds according to Examples of the invention. Compounds 38 to 43 were synthesised from Precursor 8, which in turn was synthesised from Compound 3, which in turn was synthesised from Precursor 2.

Precursor 2 was fabricated according to the method described in N. Boden et. al. J. Mater. Chem., 1995, 5, 2275.

Synthesis of Compound 3

Compound 3 was synthesised using the following method. A solution of 2-naphthalene carboxylic acid (225 mg, 1.31 mmol), palladium diacetate (0.005 mmol) and iodobenzene diacetate (0.157 mmol) in PhMe (5 mL) was heated at 70° C. under $N_2$ for 20 min. A solution of Precursor 2 (100 mg; 0.131 mmol) in PhMe (2 mL) was added and heated under reflux for 48-72 h, whilst stirring. The solution was cooled to room temperature and diluted with $CH_2Cl_2$ (20 mL). The organic phase was washed with aqueous NaOH (1 M; 2×20 mL), separated and the organic phase was dried in vacuo. The crude black solid was purified by flash column chromatography (silica; 40% $CH_2Cl_2$: 60% n-hexane) to afford Compound 3 as a yellow solid (35 mg; 32%).

The name for Compound 3 is 8-(naphthalen-2-yl)-2,3,6,11,12-pentakis(pentyloxy)triphenyleno[1,2-d]oxazole.

Compound 3 had the following characterisation data: $^1$H NMR (300 MHz, CDCl$_3$) δH: 10.22 (1H, s), 8.89 (1H, s), 8.49 (1H, dd, J 8.6, 1.7), 8.05-7.99 (2H, m), 7.96-7.91 (5H, m), 7.62-7.59 (2H, m), 4.54 (2H, t, J 6.8), 4.51 (2H, t, J 6.8), 4.32-4.25 (6H, m), 2.17-1.93 (10H, m), 1.76-1.42 (20H, m), 1.06-0.97 (15H, m) ppm. $^{13}$C NMR (100 MHz, CDCl$_3$) δC: 161.7, 149.8, 149.3, 149.0, 148.6, 143.2, 140.9, 140.6, 135.0, 133.4, 129.3, 128.9, 128.3, 128.0, 127.9, 127.4, 127.2, 125.0, 125.0, 124.4, 124.2, 123.7, 123.6, 116.7, 111.2, 108.5, 107.1, 107.0, 103.9, 70.2, 70.1, 69.8, 69.2, 29.6, 29.5, 28.9, 28.8, 28.7, 23.1, 23.0, 14.6, 14.5 ppm. MALDI+m/z: 825.5 ([M]+100%). IR λ-1 (neat): Elemental analysis Found: C, 78.95; H, 8.02; N, 1.83%. $C_{54}H_{67}NO_6$ requires C, 78.51; H, 8.17; N, 1.70%.

Synthesis of Precursor 8

Precursor 8 was synthesised using the following method. 8-(Naphthalen-2-yl)-2,3,6,11,12-pentakis(pentyloxy)triphenyleno[1,2-d]oxazole (Compound 3) (150 mg, 0.18 mmol, 1 eq) was dissolved in $CH_2Cl_2$ (10 mL) which had been dried and degassed for 10 min in a 2 necked flask fitted with a subaseal and had been purged with $N_2$ for 10 min. The green solution was stirred at −10° C. under $N_2$ for 10 min and boron tribromide (1M in $CH_2Cl_2$ solution) (0.2 mmol, 1.1 eq) was added via syringe through the subaseal. The black solution was stirred under $N_2$ for 2 h at −10° C. and then poured over crushed ice and stirred until all the ice had melted. The product was then extracted with ethyl acetate (20 mL), washed with water (3×50 mL) and evaporated to dryness yielding a brown solid. The product was then purified by flash column chromatography (20% EtOAc: n-hexane, silica) yielding 8-(naphthalen-2-yl)-2,3,6,12-tetrakis(pentyloxy)triphenyleno[1,2-d]oxazol-11-ol as a yellow solid (31 mg, 23%).

The name for Precursor 8 is 8-(naphthalen-2-yl)-2,3,6,12-tetrakis(pentyloxy)triphenyleno[1,2-d]oxazol-11-ol.

Precursor 8 had the following characterisation data $^1$H NMR $\delta_H$: (300 MHz, $CDCl_3$) 10.06 (1H, s), 8.83 (1H, s), 8.50 (1H, dd, J 8.6, 1.7), 8.05-8.03 (1H, m), 7.79 (1H, d, J 8.7), 7.91-7.89 (1H, m), 7.84 (1H, s), 7.79 (1H, s), 7.78 (1H, s), 7.74 (1H, s), 7.58-7.56 (2H, m), 5.97 (1H, s), 4.42 (2H, t, J 6.7), 4.29-4.20 (6H, m), 2.05-1.93 (8H, m), 1.63-1.45 (16H, m), 1.05-0.98 (12H, m) ppm. $^{13}$C NMR $\delta c$: (100 MHz, $CDCl_3$) 161.7, 149.4, 148.9, 146.0, 145.3, 143.0, 140.9, 140.2, 134.8, 133.2, 129.1, 128.66, 128.0, 127.9, 127.6, 127.2, 126.8, 124.8, 124.7, 124.7, 124.0, 123.6, 123.4, 116.4, 112.7, 108.1, 107.1, 103.7, 103.6, 69.9, 69.8, 69.7, 69.1, 29.3, 29.3, 29.2, 28.6, 28.5, 28.4, 22.8, 22.7, 14.3, 14.2 ppm. MALDI m/z: 755.65 ([M]$^+$ 100%), 756.66 ([M+H]$^+$ 70%), 757.67 ([M+1+H]$^+$ 25%).

EXAMPLE 1—SYNTHESIS OF COMPOUND 38

Compound 38 was synthesised by the following method. A slurry of Precursor 8 (100 mg, 0.13 mmol) and $K_2CO_3$ (114 mg, 0.83 mmol) in DMF (5 mL) was heated at reflux with a $CaCl_2$ drying tube for 0.5 h, followed by addition of methyl 2-(2-(2-chloroethoxy)ethoxy)acetate (114 mg, 0.40 mmol) and KI (75 mg, 0.5 mmol). The resultant slurry was further heated at reflux for 3 h. The reaction mixture was allowed to cool to room temperature and the precipitate filtered off via suction filtration. The solvent was evaporated from the filtrate to dryness in vacuo and the crude solid was purified by purified via flash column chromatography (silica, 25% EtOAc: 75% n-hexane) to afford Compound 38 as a yellow solid (36 mg, 30%).

The name for Compound 38 is methyl 2-(2-(2-((8-(naphthalen-2-yl)-2,3,6,12-tetrakis(pentyloxy)triphenyleno[1,2-d]oxazol-11-yl)oxy)ethoxy)ethoxy)acetate.

Compound 38 had the following characterisation data: $^1$H NMR $\delta_H$: (300 MHz, $CDCl_3$) 10.16 (1H, s), 8.83 (1H, s), 8.50 (1H, dd, J 8.6, 1.7), 8.05-8.03 (2H, m), 7.91-7.81 (5H, m), 7.58-7.56 (2H, m), 4.60 (2H, t, J 5.5), 4.42 (2H, t, J 6.7), 4.29-4.21 (6H, m), 4.20 (3H, s), 3.85-3.65 (8H, m), 2.05-1.93 (8H, m), 1.63-1.45 (16H, m), 1.05-0.98 (12H, m) ppm. $^{13}$C NMR $\delta c$: (100 MHz, $CDCl_3$) 173.9, 161.7, 149.4, 148.9, 145.9, 145.3, 142.0, 140.8, 140.4, 134.8, 133.1, 129.1, 128.7, 128.0, 127.9, 127.6, 127.2, 126.8, 124.8, 124.7, 124.6, 124.0, 123.6, 123.3, 116.5, 112.7, 108.1, 107.1, 103.7, 103.6, 71.8, 71.4, 71.2, 70.4, 69.8, 69.8, 69.7, 69.0, 68.5, 29.4, 29.3, 29.2, 28.6, 28.5, 28.4, 22.8, 22.7, 14.3, 14.2 ppm. MALDI m/z: 915.7 ([M]$^+$ 100%), 916.7 ([M+H]$^+$ 90%). Elemental analysis Found: C, 73.41; H, 7.56; N, 1.54%. $C_{58}H_{69}NO_{10}$ requires C, 73.42; H, 7.59; N, 1.53%.

EXAMPLE 2—SYNTHESIS OF COMPOUND 39

Compound 39 was synthesised using the following method. A solution of NaOH (3 mg, 0.08 mmol) in $H_2O$ (1 mL) was added to a solution of Compound 38 (35 mg, 0.04 mmol in MeOH (5 mL). The resultant solution was heated at reflux for 5 h. The reaction mixture was allowed to cool to room temperature and aliquots of 1M HCl aqueous solution was added until no further precipitate was formed. The precipitate was collected through suction filtration affording a yellow solid (24 mg, 70%).

The name for Compound 39 is 2-(2-(2-((8-(naphthalen-2-yl)-2,3,6,12-tetrakis(pentyloxy)triphenyleno[1,2-d]oxazol-11-yl)oxy)ethoxy)ethoxy)acetic acid.

Compound 39 had the following characterisation data: $^1$H NMR $\delta_H$: (300 MHz, $CDCl_3$) 10.16 (1H, s), 8.83 (1H, s), 8.50 (1H, dd, J 8.6, 1.6), 8.05-8.03 (2H, m), 7.91-7.81 (5H, m), 7.58-7.56 (2H, m), 4.60 (2H, t, J 5.5 Hz), 4.42 (2H, t, J 6.7 Hz), 4.29-4.21 (6H, m), 3.85-3.65 (8H, m), 2.05-1.93 (8H, m), 1.63-1.45 (16H, m), 1.05-0.98 (12H, m) ppm. $^{13}$NMR $\delta c$: (100 MHz, CDCl3) 175.7, 149.4, 148.9, 145.9, 145.3, 142.0, 140.8, 140.4, 134.8, 133.1, 129.1, 128.7, 128.0, 127.9, 127.6, 127.2, 126.8, 124.8, 124.7, 124.6, 124.0, 123.6, 123.3, 116.5, 112.7, 108.1, 107.1, 103.7, 103.6, 71.8, 71.4, 71.2, 70.4, 69.8, 69.8, 69.7, 69.0, 68.5, 29.4, 29.3, 29.2, 28.6, 28.5, 28.4, 22.8, 22.7, 14.3, 14.2 ppm. MALDI m/z: 901.5 ([M]$^+$ 100%), 902.5 ([M+H]$^+$ 70%). Elemental analysis Found: C, 73.24; H, 7.52; N, 1.54%. $C_{55}H_{67}NO_{10}$ requires C, 73.23; H, 7.55; N, 1.55%.

Figure 3:
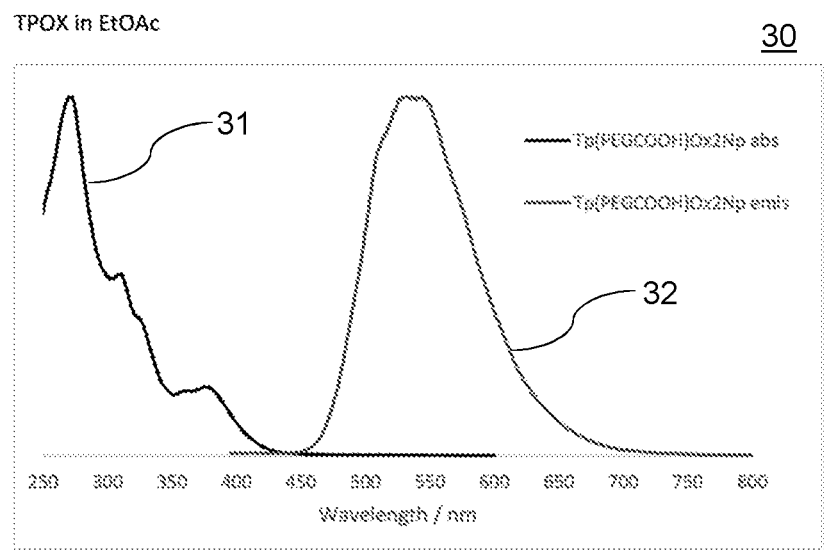
FIG. 3 is an absorption and emission spectra of Compound 39.

Referring now to FIG. 3, there is shown a spectra 30. There is shown the absorption spectra 31 and emission spectra 32 for Compound 39 in ethyl acetate.

EXAMPLE 3—SYNTHESIS OF COMPOUND 40

Compound 40 was synthesised using the following method. A slurry of Precursor 8 (100 mg, 0.13 mmol) and $K_2CO_3$ (37 mg, 0.26 mmol) in MeCN (5 mL) was heated at reflux with a $CaCl_2$ drying tube for 0.5 h, followed by addition of 2-(2-(2-azidoethoxy)ethoxy)ethyl 4-methylbenzenesulfonate (87 mg, 0.26 mmol). The resultant slurry was further heated at reflux for 24 h. The reaction mixture was allowed to cool to room temperature and the precipitate filtered off via suction filtration. The solvent was evaporated from the filtrate to dryness in vacuo and the crude solid was purified by purified via flash column chromatography (silica, 25% EtOAc: 75% n-hexane) to afford Compound 38 as a yellow solid (18 mg, 15%).

The name for Compound 40 is 11-(2-(2-(2-azidoethoxy)ethoxy)ethoxy)-8-(naphthalen-2-yl)-2,3,6,12-tetrakis(pentyloxy)triphenyleno[1,2-d]oxazole.

Compound 40 had the following characterisation data: $^1$H NMR $\delta_H$: (300 MHz, $CDCl_3$) 10.14 (1H, s), 8.82 (1H, s), 8.51 (1H, dd, J 8.6, 1.7), 8.06-8.03 (2H, m), 7.91-7.80 (5H, m), 7.57-7.55 (2H, m), 4.59 (2H, t, J 5.5 Hz), 4.41 (2H, t, J 6.7 Hz), 4.29-4.20 (6H, m), 4.15-4.10 (2H, m), 3.87-3.82 (2H, m), 3.69-3.57 (4H, m), 3.30-3.21 (2H, m), 2.05-1.93 (8H, m), 1.63-1.45 (16H, m), 1.05-0.98 (12H, m) ppm. $^{13}$C NMR $\delta c$: (100 MHz, $CDCl_3$) 161.7, 149.4, 148.8, 145.9, 145.4, 142.9, 140.8, 140.2, 134.7, 133.2, 129.1, 128.7, 128.0, 127.9, 127.6, 127.1, 126.9, 124.8, 124.7, 124.6, 124.0, 123.6, 123.4, 116.4, 112.7, 108.1, 107.2, 103.7, 103.6, 72.5, 70.7, 70.4, 70.1, 69.9, 69.8, 69.7, 69.0, 50.6, 29.32, 29.30, 29.17, 28.54, 28.46, 28.43, 22.75, 22.71, 14.27, 14.21 ppm. MALDI m/z: 912.9 ([M]$^+$ 100%), 913.9 ([M+H]$^+$ 90%). Elemental analysis Found: C, 73.36; H, 7.55; N, 6.12%. $C_{55}H_{68}N_4O_8$ requires C, 73.34; H, 7.51; N, 6.14%.

EXAMPLE 4—SYNTHESIS OF COMPOUND 41

Compound 41 was synthesised using the following method. A slurry of Precursor 8 (100 mg, 0.13 mmol) and $K_2CO_3$ (37 mg, 0.26 mmol) in MeCN (5 mL) was heated at reflux with a $CaCl_2$ drying tube for 0.5 h followed by addition of 2-(2-(2-(2,5-dioxo-2,5-dihydro-1H-pyrrol-1-yl)ethoxy)ethoxy)ethyl 4-methylbenzenesulfonate (101 mg, 0.26 mg). The resultant slurry was further heated at reflux for 24 h h. The reaction mixture was allowed to cool to room temperature and the precipitate filtered off via suction filtration. The solvent was evaporated from the filtrate to dryness in vacuo and the crude solid was purified by purified via flash column chromatography (silica, silica, 50% EtOAc: 50% n-hexane) to afford Compound 38 as a yellow solid (15 mg, 13%).

The name for Compound 41 is 2-(2-(2-((8-(naphthalen-2-yl)-2,3,6,12-tetrakis(pentyloxy)triphenyleno[1,2-d]oxazol-11-yl)oxy)ethoxy)ethoxy)ethan-1-amine.

Compound 41 had the following characterisation data: $^1$H NMR $\delta_H$: (300 MHz, $CDCl_3$) 10.13 (1H, s), 8.82 (1H, s), 8.50 (1H, dd, J 8.6, 1.7), 8.07-8.03 (2H, m), 7.91-7.81 (5H, m), 7.57-7.57 (2H, m), 4.58 (2H, t, J 5.5 Hz), 4.43 (2H, t, J 6.7 Hz), 4.28-4.20 (6H, m), 4.14-4.10 (2H, m), 3.86-3.82 (2H, m), 3.69-3.57 (4H, m), 3.17-3.19 (2H, m), 2.04-1.92 (8H, m), 1.63-1.44 (16H, m), 1.04-0.97 (12H, m) ppm. $^{13}$C NMR δc: (100 MHz, $CDCl_3$) 161.7, 149.4, 148.8, 145.9, 145.4, 142.9, 140.8, 140.2, 134.7, 133.2, 129.1, 128.7, 128.0, 127.9, 127.6, 127.1, 126.9, 124.8, 124.7, 124.6, 124.0, 123.6, 123.4, 116.4, 112.7, 108.1, 107.2, 103.7, 103.6, 72.3, 70.6, 70.3, 70.0, 69.9, 69.8, 69.7, 69.0, 42.5, 29.4, 29.3, 29.2, 28.5, 28.5, 28.4, 22.75, 22.7, 14.3, 14.2 ppm. MALDI m/z: 886.5 ([M]$^+$ 100%), 887.6 ([M+H]$^+$ 70%).

EXAMPLE 7—USE OF COMPOUND 39 AS A BIOSENSOR WITH AN ANTIBODY

Figure 4:
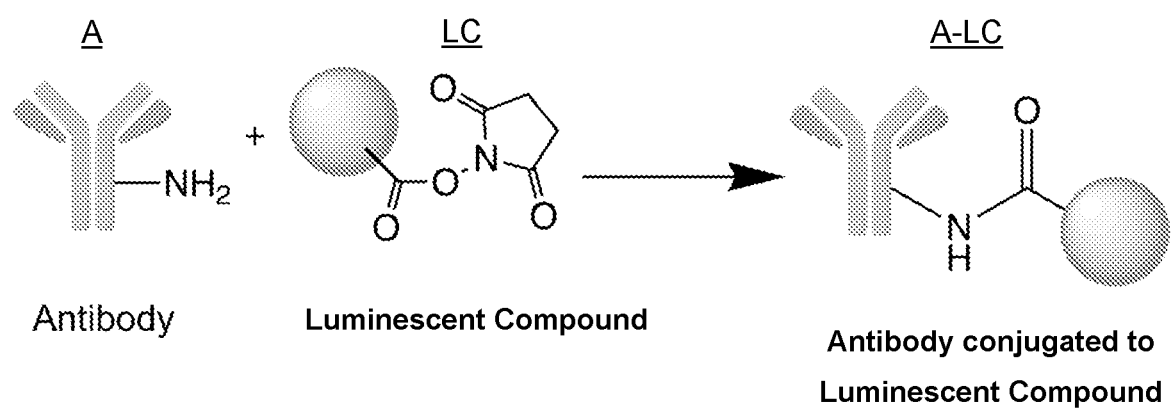
FIG. 4 is a schematic route to conjugate an antibody to a luminescent compound according to an embodiment of the invention.

Referring now to FIG. 4, there is shown a schematic route 3 to conjugating an antibody A to a luminescent compound LC to produce a conjugated antibody A-LC according to an Example of the invention.

The luminescent compound LC used in this example was Compound 39. Compound 39 was activated towards conjugation in the following method. A solution was prepared containing the following components:

10 μL of Compound 39 dissolved in DMSO at a concentration of 3.8 mg/ml (4.2 mM);
10 μL of TSTU (N,N,N',N'-tetramethyl-O—(N-succinimidyl)uronium tetrafluoroborate) at a concentration of 1.4 μg/ml (4.7 mM);
1 μL triethylamine to a final concentration of 0.67 μL/mL (6.6 μM).

The resulting solution was held at room temperature on a shaking incubator for 20 minutes to produce the "biosensor solution" containing the luminescent compound, Compound 39 comprising an NHS (N-hydroxysuccinimide) ester instead of a carboxylic acid functional group.

The antibody A was prepared in the following method. 50 μL of the Antibody (2 mg/mL (~14 μM)) was added to an Amicon® Ultra-0.5 ml filter containing a 30 kDa cut-off filter. The antibody buffer was exchanged for 0.1 M sodium borate buffer, pH 8.5, using two rounds of dilution/concentration with 400 μL additions of the borate buffer to produce the "antibody solution".

The antibody A was conjugated to the luminescent compound LC in the following method. The "antibody solution" and the "biosensor solution" were directly combined and allowed to react for 1 hr at room temperature. The resulting conjugated antibody A-LC was purified from unreacted luminescent compound using a standard desalting column (ZebaSpin, 7 kDa MWCO), prior to characterisation of the labelled conjugate by UV-vis spectroscopy.

Figure 5:
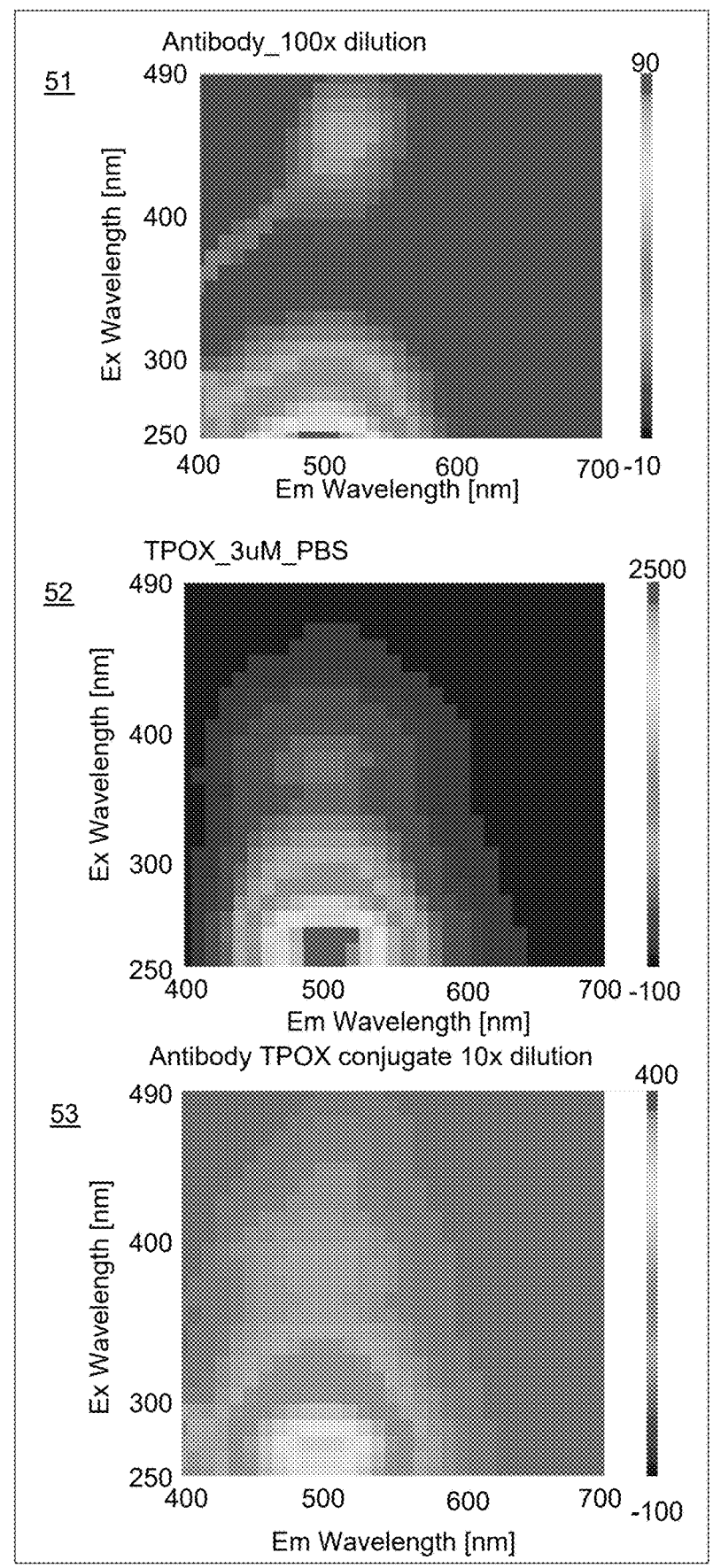
FIG. 5 is a series of spectra showing the conjugation of an antibody to a luminescent compound, according to an Example of the invention.

Referring now to FIG. 5, there is shown a series of spectra showing the conjugation of the antibody A to the luminescent compound LC according to this Example of the invention. Spectra 51 is taken of the antibody A alone. Spectra 52 is taken of the luminescent compound LC (Compound 39) alone. Spectra 53 is taken of the antibody conjugated to the luminescent compound A-LC.

Figure 6:
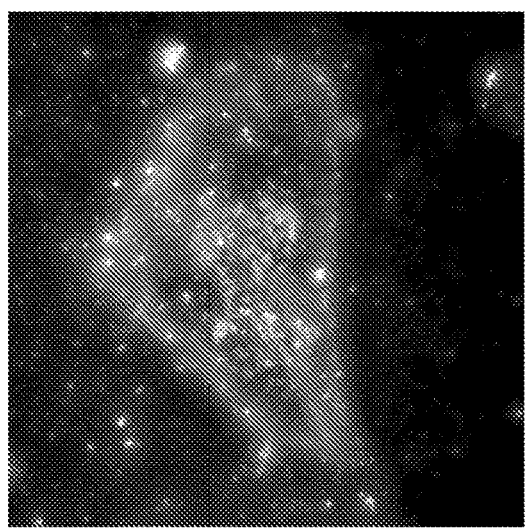
FIG. 6 is a series of images showing the conjugation of an antibody to a luminescent compound, according to an Example of the invention.
Figure 6:
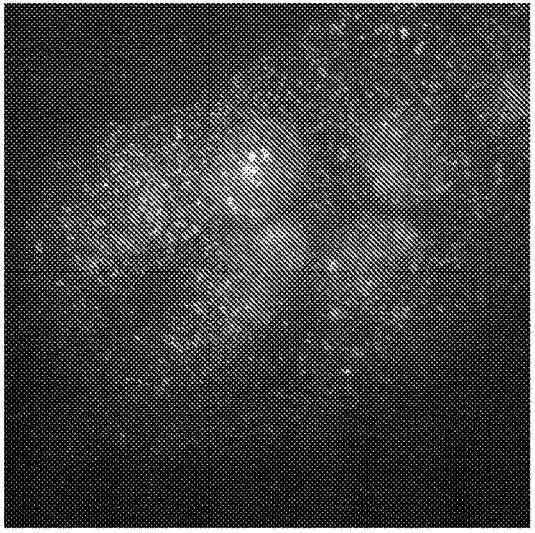
Figure 6:
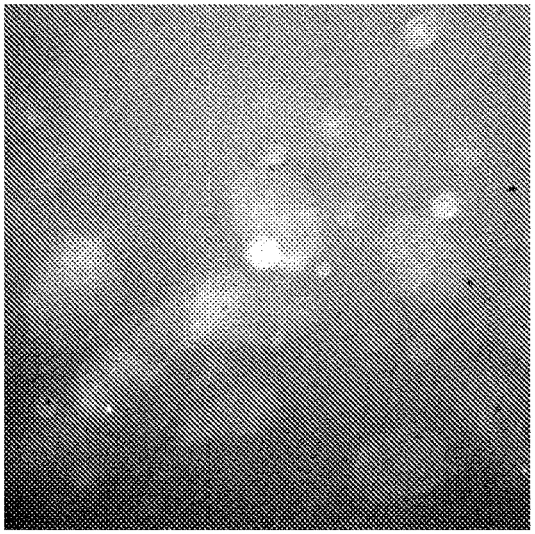
Figure 7:
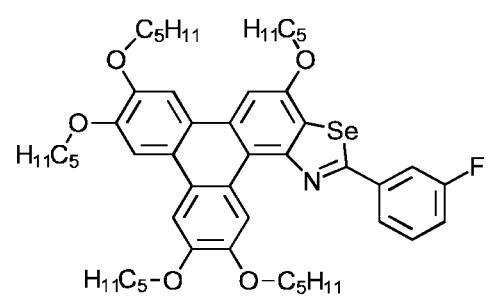
FIG. 7 is Compound 44 according to a further Example of the invention.

Referring now to FIG. 6, there is shown a series of images showing the conjugation of an antibody to a luminescent compound according to this Example of the invention. Image 61 is of the luminescent compound LC alone, image 62 is of a control sample comprising an antibody conjugated to Alexa488® according to a comparative Example of the invention, and image 63 is of the antibody conjugated to the luminescent compound A-LC according to Example 7 of the invention.

EXAMPLE 8—SYNTHESIS OF COMPOUND 44

Compound 44 was synthesised using the following method. A solution of Precursor 2 (100 mg, 0.132 mmol), 3-fluorobenzoyl chloride (92 mg, 0.658 mmol) and N,N-diisopropylethylamine (0.1 mL, 0.574 mmol) in PhMe (5 mL) was heated to and held at reflux for 18 h under $N_2$. The reaction was cooled to room temperature and then evaporated to dryness in vacuo purified via flash column chromatography (silica, 60% $CH_2Cl_2$: 40% n-hexane) to afford an intermediate as a brown solid (19 mg, 18%).

The intermediate (3-fluoro-N-(2,3,6,7,10,11-hexakis(pentyloxy)triphenylen-1-yl)benzamide) (100 mg, 0.11 mmol) was dissolved in xylenes (10 mL) and Woollins reagent (117.8 mg, 0.22 mmol) was added to the flask. The reaction was stirred at reflux for 24 h before being cooled to room temperature causing the formation of a grey precipitate. The contents of the flask were filtered through filter paper and the filtrate recovered. The filtrate was evaporated to dryness and purified by column chromatography (silica, 40% dichloromethane:hexane) and (silica, 1% acetone:hexane) yielding 8-(3-fluorophenyl)-2,3,6,11,12-pentakis(pentyloxy)triphenyleno[1,2-d][1,3]selenazole as a yellow solid (1.8 mg).

The name for Compound 44 is 8-(3-fluorophenyl)-2,3,6,11,12-pentakis(pentyloxy)triphenyleno[1,2-d][1,3]selenazole.

Compound 44 had the following characterisation data: $^1$H NMR $\delta_H$ (500 MHz, $CDCl_3$) 10.40 (1H, s), 8.00 (1H, s), 7.97 (1H, d, J 9.8 Hz), 7.95 (1H, s), 7.92 (1H, s), 7.90 (1H, d, J 7.8 Hz), 7.87 (1H, s), 7.49 (1H, dd, J 14.1, 8.5 Hz), 7.24-7.21 (1H, m), 4.45 (2H, t, J 6.8 Hz), 4.42 (2H, t, J 6.7 Hz), 4.28 (6H, dt, J 13.4, 6.6 Hz), 2.06-1.94 (10H, m), 1.61-1.44 (20H, m), 1.03-0.93 (15H, m) ppm. TOF LD$^+$ m/z=860.4 ([M+2+H]$^+$ 30%), 859.4 ([M+2]$^+$ 60%), 858.4 ([M+H]$^+$ 90%), 857.4 ([M]$^+$ 100%), 856.4 ([M−2+H]$^+$ 40%), 855.4 ([M−2]$^+$ 60%), 854.4 ([M−3]$^+$ 30%), 825.5 ([TpOxPhmF+MeOH]$^+$), 793.4 ([TpOxPhmF]$^+$).

It will be appreciated by those skilled in the art that any number of combinations of the aforementioned features and/or those shown in the appended drawings provide clear advantages over the prior art and are therefore within the scope of the invention described herein.

Some aspects and embodiments of the invention are defined by the following clauses:

1. A luminescent molecule represented by the following general formula:

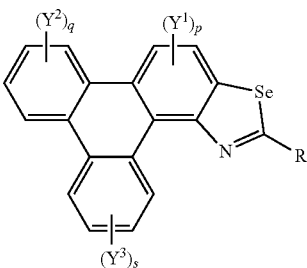

wherein R represents an aromatic group and/or an aliphatic group;

p is an integer of 1 or 2;

q and s are independently integers of 1, 2, 3, or 4;

$Y^1$, $Y^2$, and $Y^3$ independently represent a hydrogen atom, a deuterium atom, a fluorine atom, a chlorine atom, a bromine atom, a substituted or unsubstituted alkyl group, a substituted or unsubstituted aryl group, a polyether chain, a polyglycol group (e.g. a substituted or unsubstituted group comprising a polyglycol moiety), an oxygen atom (e.g. a hydroxyl group or an alkylated oxygen atom forming an alkoxy group), a nitrogen atom (e.g. a primary, secondary, or tertiary amine group), a cyano group, a nitro group;

$Y^1$, $Y^2$, and/or $Y^3$ may combine together to form a condensed ring (e.g. a condensed aromatic ring).

2. The luminescent molecule according to clause 1, represented by the following general formula:

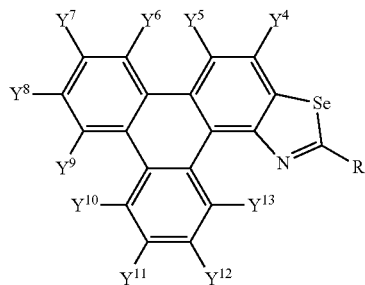

wherein R represents an aromatic group and/or an aliphatic group;

$Y^4$, $Y^5$, $Y^6$, $Y^7$, $Y^8$, $Y^9$, $Y^{10}$, $Y^{11}$, $Y^{12}$, $Y^{13}$ may independently represent a hydrogen atom, a deuterium atom, a fluorine atom, a chlorine atom, a bromine atom, a substituted or unsubstituted alkyl group, a substituted or unsubstituted aryl group, a polyether chain, a polyglycol group (e.g. a substituted or unsubstituted group comprising a polyglycol moiety), an oxygen atom (e.g. a hydroxyl group or an alkylated oxygen atom forming an alkoxy group), a nitrogen atom (e.g. a primary, secondary, or tertiary amine group), a cyano group, a nitro group;

two or more of $Y^4$, $Y^5$, $Y^6$, $Y^7$, $Y^8$, $Y^9$, $Y^{10}$, $Y^{11}$, $Y^{12}$, $Y^{13}$ may combine together to form a condensed ring (e.g. a condensed aromatic ring).

3. A luminescent compound according to any preceding clause, wherein one or more or all of $Y^1$ to $Y^{13}$ represent or comprise an alkyl group, e.g. a straight, linear chain alkyl group or a branched chain alkyl group.

4. A luminescent compound according to clause 3, wherein the alkyl group comprises between 1 and 20 carbon atoms, e.g. between 2 and 18 carbon atoms, 3 and 17 carbon atoms, 4 and 16 carbon atoms.

5. A luminescent compound according to clause 3 or 4, wherein one or more or all of $Y^1$ to $Y^3$, or $Y^4$ to $Y^{13}$, independently represent an alkoxy group, e.g. an OR' group wherein R' is a straight or branched alkyl chain.

6. A luminescent compound according to clause 5, wherein one or more or all of $Y^1$ to $Y^3$, or $Y^4$ to $Y^{13}$ consist of a straight chain alkoxy group selected from one or more of a $OCH_3$, $OC_2H_5$, $OC_3H_7$, $OC_4H_9$, $OC_5H_{11}$, $OC_6H_{13}$, $OC_7H_{15}$, $OC_8H_{17}$, $OC_{10}H_{19}$, or $OC_{10}H_{21}$ group or combinations thereof.

7. A luminescent compound according to clause 6, wherein $Y^4$, $Y^7$, $Y^8$, $Y^{11}$, $Y^{12}$ each each represent an alkoxyl group, e.g. an OR' group.

8. A luminescent compound according to clause 7, wherein $Y^4$, $Y^7$, $Y^8$, $Y^{11}$ each represent an $OC_5H_{11}$ group.

9. A luminescent compound according to clauses 2 to 8, wherein one or more or all of $Y^5$, $Y^6$, $Y^9$, $Y^{10}$, $Y^{13}$ represent a hydrogen atom.

10. A luminescent compound according to any preceding clause, represented by the following general formula:

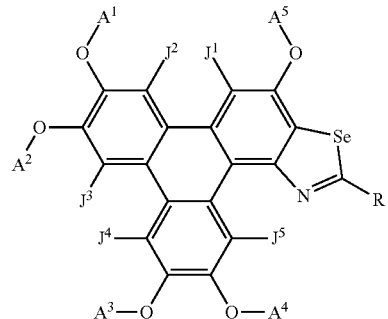

wherein R represents an aromatic group and/or an aliphatic group;

$J^1$, $J^2$, $J^3$, $J^4$, $J^5$ independently represent a hydrogen atom, a deuterium atom, a fluorine atom, a chlorine atom, a bromine atom, a substituted or unsubstituted alkyl group, a substituted or unsubstituted aryl group, a polyether chain, a polyglycol group (e.g. a substituted or unsubstituted group comprising a polyglycol moiety), an oxygen atom (e.g. a hydroxyl group or an alkylated oxygen atom forming an alkoxy group), a nitrogen atom (e.g. a primary, secondary, or tertiary amine group), a cyano group, a nitro group;

wherein $J^1$ and $J^2$, or $J^3$ and $J^4$ may combine together to form a condensed ring (e.g. a condensed aromatic ring);

$A^1$, $A^2$, $A^3$, $A^4$, $A^5$ independently represents a hydrogen atom, a substituted or unsubstituted aryl group, a substituted or unsubstituted alkyl group, or a polyether group.

11. A luminescent compound according to clause 10, wherein one or more or all of $A^1$ to $A^5$ comprise an alkyl group.

12. A luminescent compound according to clause 10 or 11, wherein the alkyl group(s) consist of a straight chain alkyl group selected from one or more of a $CH_3$, $C_2H_5$, $C_3H_7$, $C_4H_9$, $C_5H_{11}$, $C_6H_{13}$, $C_7H_{15}$, $C_8H_{17}$, $C_9H_{19}$, or $C_{10}H_{21}$ alkyl group.

13. A luminescent compound according to clause 10, 11, or 12, wherein one or more of $J^1$ to $J^5$ independently represent a hydrogen atom.

14. A luminescent compound according to any of clauses 10 to 13, wherein $J^1$, $J^2$, $J^3$, $J^4$, $J^5$ each represent a hydrogen atom, and $A^1$, $A^2$, $A^3$, $A^4$, $A^5$ each represent an alkyl chain, e.g. a $C_5H_{11}$ moiety.

15. A luminescent compound according to any preceding clause, represented by the formula of Compound 44 of this specification.

16. A luminescent compound according to clause 1 or 2, represented by the following general formula:

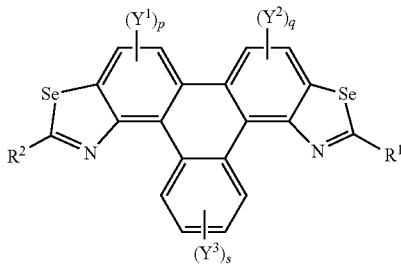

wherein $R^1$ and $R^2$ independently represents an aromatic group and/or an aliphatic group; p and q are independently an integer of 1 to 2;
s is an integer of 1 to 4;
$Y^1$, $Y^2$, and $Y^3$ independently represent a hydrogen atom, a deuterium atom, a fluorine atom, a chlorine atom, a bromine atom, a substituted or unsubstituted alkyl group, a substituted or unsubstituted aryl group, a polyether chain, a polyglycol group (e.g. a substituted or unsubstituted group comprising a polyglycol moiety), an oxygen atom (e.g. a hydroxyl group or an alkylated oxygen atom forming an alkoxy group), a nitrogen atom (e.g. a primary, secondary, or tertiary amine group), a cyano group, a nitro group;
$Y^1$, $Y^2$, or $Y^3$ may combine together to form a condensed ring (e.g. a condensed aromatic ring).

17. A luminescent compound according to clause 1 or 2, represented by the following general formula:

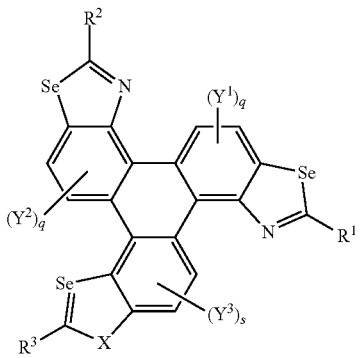

wherein $R^1$, $R^2$, $R^3$ independently represent an aromatic group and/or an aliphatic group; p, q, and s are each independently an integer of 1 to 2;
$Y^1$, $Y^2$, and $Y^3$ independently represent a hydrogen atom, a deuterium atom, a fluorine atom, a chlorine atom, a bromine atom, a substituted or unsubstituted alkyl group, a substituted or unsubstituted aryl group, a polyether chain, a polyglycol group (e.g. a substituted or unsubstituted group comprising a polyglycol moiety), an oxygen atom (e.g. a hydroxyl group or an alkylated oxygen atom forming an alkoxy group), a nitrogen atom (e.g. a primary, secondary, or tertiary amine group), a cyano group, a nitro group.

18. A luminescent compound according to clause 1 or 2, represented by the following general formula:

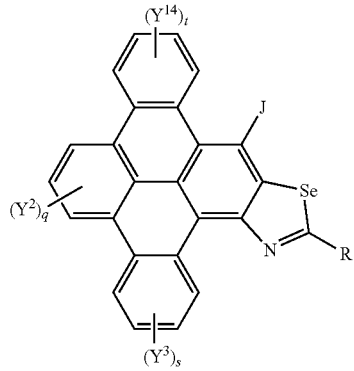

wherein R independently represents an aromatic group and/or an aliphatic group;
q is independently an integer of 1 to 3;
s is independently an integer of 1 to 4;
t is independently an integer of 1 to 4;
$Y^2$, $Y^3$, and $Y^{14}$ and J independently represent a hydrogen atom, a deuterium atom, a fluorine atom, a chlorine atom, a bromine atom, a substituted or unsubstituted alkyl group, a substituted or unsubstituted aryl group, a polyether chain, a polyglycol group (e.g. a substituted or unsubstituted group comprising a polyglycol moiety), an oxygen atom (e.g. a hydroxyl group or an alkylated oxygen atom forming an alkoxy group), a nitrogen atom (e.g. a primary, secondary, or tertiary amine group), a cyano group, a nitro group;
$Y^2$, $Y^3$, and/or $Y^{14}$ may combine together to form a condensed ring (e.g. a condensed aromatic ring).

19. A luminescent compound according to clause 18, represented by the following general formula:

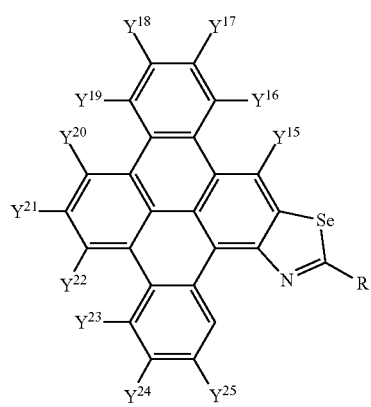

wherein R independently represents an aromatic group and/or an aliphatic group;

$Y^{15}, Y^{16}, Y^{17}, Y^{18}, Y^{19}, Y^{20}, Y^{21}, Y^{22}, Y^{23}, Y^{24}, Y^{25}, Y^{26}$ independently represent a hydrogen atom, a deuterium atom, a fluorine atom, a chlorine atom, a bromine atom, a substituted or unsubstituted alkyl group, a substituted or unsubstituted aryl group, a polyether chain, a polyglycol group (e.g. a substituted or unsubstituted group comprising a polyglycol moiety), an oxygen atom (e.g. a hydroxyl group or an alkylated oxygen atom forming an alkoxy group), a nitrogen atom (e.g. a primary, secondary, or tertiary amine group), a cyano group, a nitro group;

two or more of $Y^{15}$, $Y^{16}$, $Y^{17}$, $Y^{18}$, $Y^{19}$, $Y^{20}$, $Y^{21}$, $Y^{22}$, $Y^{23}$, $Y^{24}$, $Y^{25}$, $Y^{26}$ combine together to form a condensed ring (e.g. a condensed aromatic ring).

20. A luminescent compound according to clause 19, wherein one or more or all of $Y^{15}$, $Y^{17}$, $Y^{18}$, $Y^{20}$, $Y^{21}$, $Y^{24}$, $Y^{25}$ each represent an OR' group, e.g. an $OC_5H_{11}$ group or an $OCH_3$ group.

21. A luminescent compound according to clause 19 or 20, wherein one or more or all of $Y^{16}$, $Y^{19}$, $Y^{22}$, $Y^{23}$, $Y^{26}$ each represent a hydrogen atom.

The invention claimed is:

1. A luminescent compound represented by the following general formula:

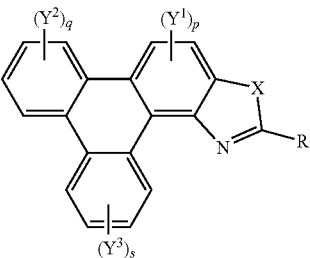

wherein X represents one of NH, an oxygen atom, a sulphur atom, PH, or a selenium atom;

R represents an aromatic group and/or an aliphatic group;

p is an integer of 1 or 2;

q and s are independently integers of 1, 2, 3, or 4;

$Y^1$, $Y^2$, and $Y^3$ independently comprise, consist of, or represent a hydrogen atom, a deuterium atom, a fluorine atom, a chlorine atom, a bromine atom, a substituted or unsubstituted alkyl group, a substituted or unsubstituted aryl group, a polyether chain, a polyglycol group, an alkoxy group, hydroxyl, an amine, a cyano group, or a nitro group;

two or more of $Y^1$, $Y^2$, and/or $Y^3$ may combine together to form a condensed ring; wherein one or more of $Y^1$, $Y^2$, and/or $Y^3$ comprises a spacing portion comprising a continuous chain of between 3 and 20 atoms, and further comprising a functional group capable of forming a covalent bond with a second species, the functional group being selected from one or more of a carboxylic acid, an ester, an azide, an amine, a maleimide, a thiol, an isothiocyanate, a carbonyl, and/or an aliphatic alcohol.

2. A luminescent compound according to claim 1, represented by the following general formula:

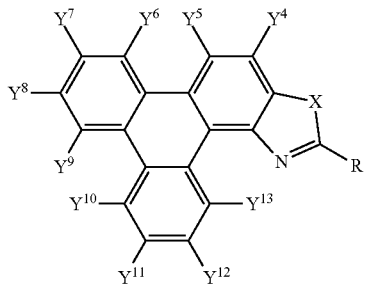

wherein X represents one of NH, an oxygen atom, a sulphur atom, PH, or a selenium atom;

R represents an aromatic group and/or an aliphatic group;

$Y^4$, $Y^5$, $Y^6$, $Y^7$, $Y^8$, $Y^9$, $Y^{10}$, $Y^{11}$, $Y^{12}$, $Y^{13}$ independently comprise, consist of, or represent a hydrogen atom, a deuterium atom, a fluorine atom, a chlorine atom, a bromine atom, a substituted or unsubstituted alkyl group, a substituted or unsubstituted aryl group, a polyether chain, a polyglycol group, an alkoxy group, hydroxyl, an amine, a cyano group, a nitro group;

two or more of $Y^4$, $Y^5$, $Y^6$, $Y^7$, $Y^8$, $Y^9$, $Y^{10}$, $Y^{11}$, $Y^{12}$, $Y^{13}$ may combine together to form a condensed ring;

wherein one or more of $Y^4$, $Y^5$, $Y^6$, $Y^7$, $Y^8$, $Y^9$, $Y^{10}$, $Y^{11}$, $Y^{12}$, $Y^{13}$ comprises a spacing portion comprising a continuous chain of between 3 and 20 atoms and further comprising a functional group capable of forming a covalent bond with a second species, the functional group being selected from one or more of a carboxylic acid, an ester, an azide, an amine, a maleimide, a thiol, an isothiocyanate, a carbonyl, and/or an aliphatic alcohol.

3. A luminescent compound according to claim 1, wherein the functional group capable of forming a covalent bond with a second species is located at a or the terminus of the spacing portion.

4. A luminescent compound according to claim 1, wherein the spacing portion comprises a continuous chain of between 3 and 20 atoms selected from carbon atoms or a combination of carbon atoms and heteroatoms.

5. A luminescent compound according to claim 4, wherein the spacing portion comprises or consists of a polyether chain comprising a continuous chain of between five and twenty atoms selected from carbon atoms and oxygen atoms.

6. A luminescent compound according to claim 5, wherein the spacing portion and the functional group (FG) capable of forming a covalent bond with a second species consists of a —O—$(CH_2CH_2O)_2CH_2CH_2$-FG moiety or a —$(CH_2CH_2O)_2CH_2$FG moiety, such that one or more of $Y^1$ to $Y^3$ consists of an —O—$(CH_2CH_2O)_2CH_2CH_2$FG moiety or an —O—$(CH_2CH_2O)_2CH_2$FG moiety.

7. A luminescent compound according to claim 1, wherein one or more of $Y^1$ to $Y^3$ independently represent an alkoxy group and/or wherein R represents an aromatic group, a substituted phenyl group or a polycyclic aromatic hydrocarbon.

8. A luminescent compound according to claim 1, comprising a single spacing portion and a single functional group capable of forming a covalent bond with a second species.

9. A luminescent compound according to claim 2, wherein $Y^5$, $Y^6$, $Y^9$, $Y^{10}$, $Y^{13}$ each represent a hydrogen atom, $Y^4$, $Y^7$, $Y^8$, $Y^{11}$ each represent an OR' group, and $Y^{12}$ represents a —O—$(CH_2CH_2O)_2CH_2CH_2FG$ moiety.

10. A luminescent compound according to claim 1, represented by the following general formula:

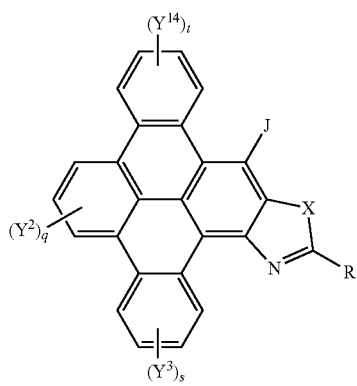

wherein X represents one of NH, an oxygen atom, a sulphur atom, PH, or a selenium atom;

R independently represents an aromatic group and/or an aliphatic group;

q is independently an integer of 1 to 3;

s is independently an integer of 1 to 4;

t is independently an integer of 1 to 4;

$Y^2$, $Y^3$, and $Y^{14}$ and J independently comprise, consist of, or represent a hydrogen atom, a deuterium atom, a fluorine atom, a chlorine atom, a bromine atom, a substituted or unsubstituted alkyl group, a substituted or unsubstituted aryl group, a polyether chain, a polyglycol group, an alkoxy group, hydroxyl, an amine, a cyano group, a nitro group;

two or more of $Y^2$, $Y^3$, and/or $Y^{14}$ may combine together to form a condensed ring;

wherein one or more of $Y^2$, $Y^3$, $Y^{14}$ and/or J comprise a spacing portion comprising a continuous chain of between 3 and 20 atoms and further comprising a functional group capable of forming a covalent bond with a second species, the functional group being selected from one or more of a carboxylic acid, an ester, an azide, an amine, a maleimide, a thiol, an isothiocyanate a carbonyl, and/or an aliphatic alcohol.

11. A luminescent compound according to claim 10, wherein the spacing portion of one or more of $Y^2$, $Y^3$, and/or $Y^{14}$ comprises a polyether chain, which is covalently bonded to the functional group capable of forming a covalent bond with a second species, e.g. the spacing portion consists of an —O—$(CH_2CH_2O)_2CH_2CH_2$-moiety or a —O—$(CH_2CH_2O)_2CH_2$-moiety.

12. A luminescent compound according to claim 10, represented by the following general formula:

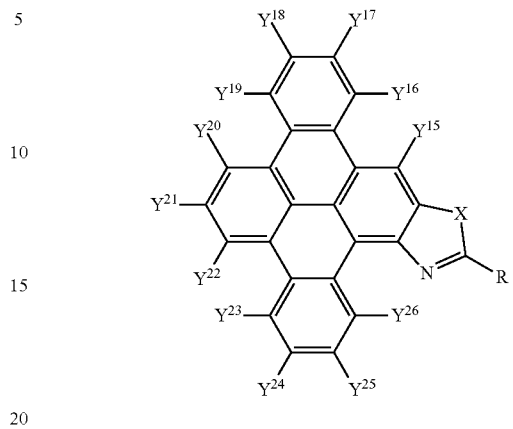

wherein X represents one of NH, an oxygen atom, a sulphur atom, PH, or a selenium atom;

R independently represents an aromatic group and/or an aliphatic group;

$Y^{15}$, $Y^{16}$, $Y^{17}$, $Y^{18}$, $Y^{19}$, $Y^{20}$, $Y^{21}$, $Y^{22}$, $Y^{23}$, $Y^{24}$, $Y^{25}$, $Y^{26}$ independently comprise, consist of, or represent a hydrogen atom, a deuterium atom, a fluorine atom, a chlorine atom, a bromine atom, a substituted or unsubstituted alkyl group, a substituted or unsubstituted aryl group, a polyether chain, a polyglycol group, an oxygen atom, a nitrogen atom, an alkoxy group, hydroxyl, an amine, a cyano group, a nitro group;

two or more of $Y^{15}$, $Y^{16}$, $Y^{17}$, $Y^{18}$, $Y^{19}$, $Y^{20}$, $Y^{21}$, $Y^{22}$, $Y^{23}$, $Y^{24}$, $Y^{25}$, $Y^{26}$ combine together to form a condensed ring;

wherein one or more of $Y^{15}$, $Y^{17}$, $Y^{18}$, $Y^{20}$, $Y^{21}$, $Y^{24}$, $Y^{25}$ comprises a spacing portion comprising a continuous chain of between 3 and 20 atoms and further comprising a functional group capable of forming a covalent bond with a second species, the functional group being selected from one or more of a carboxylic acid, an ester, an azide, an amine, a maleimide, a thiol, an isothiocyanate a carbonyl, and/or an aliphatic alcohol.

13. A luminescent compound represented by the following general formula:

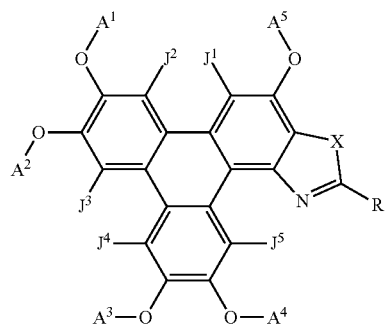

wherein X represents one of NH, an oxygen atom, a sulphur atom, PH, or a selenium atom;

R represents an aromatic group and/or an aliphatic group;

$J^1$, $J^2$, $J^3$, $J^4$, $J^5$ independently represent a hydrogen atom, a deuterium atom, a fluorine atom, a chlorine atom, a bromine atom, a substituted or unsubstituted alkyl group, a substituted or unsubstituted aryl group, a polyether chain, a polyglycol group, an alkoxy group, hydroxyl, an amine, a cyano group, a nitro group;

wherein $J^1$ and $J^2$, or $J^3$ and $J^4$ may combine together to form a condensed ring;

$A^1$, $A^2$, $A^3$, $A^4$, $A^5$ independently represents a hydrogen atom, a substituted or unsubstituted aryl group, a substituted or unsubstituted alkyl group, a polyether group;

wherein one or more of $A^1$, $A^2$, $A^3$, $A^4$, $A^5$ comprises a functional group capable of forming a covalent bond with a second species.

14. A luminescent compound according to claim 12, wherein the functional group is selected from a carboxylic acid moiety, an ester, an azide, an amine, a maleimide, a thiol moiety, an isothiocyanate a carbonyl and/or an aliphatic alcohol and/or wherein four out of five of $A^1$, $A^2$, $A^3$, $A^4$, $A^5$ independently represent an alkyl group and/or wherein one out of five of $A^1$, $A^2$, $A^3$, $A^4$, $A^5$ comprises or consists of a spacing portion and a functional group capable of forming a covalent bond with a second species.

15. A luminescent compound according to claim 13, wherein the functional group is provided at a terminus of the spacing portion, and the spacing portion and functional group are selected from —O—$(CH_2CH_2O)_2CH_2CH_2$-FG or —O—$(CH_2CH_2O)_2CH_2$-FG, wherein 'FG' is the functional group.

16. A luminescent compound according to claim 14, wherein X represents an oxygen atom and $J^1$, $J^2$, $J^3$, $J^4$, $J^5$ independently represent a hydrogen atom.

17. A luminescent compound according to claim 1, covalently bonded to a second species.

18. A kit of parts suitable for use in covalently bonding the luminescent compound of claim 1 to a second species, the kit of parts comprising one or more luminescent compound(s) of claim 1 and a solvent suitable for dissolving or suspending the luminescent compound(s).

19. A luminescent compound according to claim 13, covalently bonded to a second species.

20. A kit of parts suitable for use in covalently bonding the luminescent compound of claim 13 to a second species, the kit of parts comprising one or more luminescent compound(s) of claim 13 and a solvent suitable for dissolving or suspending the luminescent compound(s).

\* \* \* \* \*